United States Patent [19]

Tatsumi

[11] Patent Number: 4,942,737

[45] Date of Patent: Jul. 24, 1990

[54] DRIVE CONTROL SYSTEM FOR HYDRAULIC CONSTRUCTION MACHINE

[75] Inventor: Akira Tatsumi, Tokyo, Japan

[73] Assignee: Hitachi Construction Machinery Co., Ltd., Tokyo, Japan

[21] Appl. No.: 205,321

[22] PCT Filed: Oct. 2, 1987

[86] PCT No.: PCT/JP87/00737

§ 371 Date: May 31, 1988

§ 102(e) Date: May 31, 1988

[87] PCT Pub. No.: WO88/02441

PCT Pub. Date: Apr. 7, 1988

[30] Foreign Application Priority Data

Oct. 5, 1986 [JP] Japan ............ 61-236676

[51] Int. Cl.[5] ............ F16D 31/02

[52] U.S. Cl. ............ 60/431; 60/433; 60/434; 91/461

[58] Field of Search ............ 60/431, 432, 433, 434; 91/461

[56] References Cited

U.S. PATENT DOCUMENTS

| | | | |
|---|---|---|---|
| 3,943,715 | 3/1976 | Miyao et al. | 60/431 |
| 4,102,132 | 7/1978 | Palmer | 60/433 |
| 4,124,095 | 11/1978 | Ezure | 60/433 X |
| 4,373,850 | 2/1983 | Durham | 414/699 |
| 4,400,939 | 8/1983 | Moranduzzo et al. | 60/431 |
| 4,738,104 | 4/1988 | Hahmann et al. | 60/433 X |

FOREIGN PATENT DOCUMENTS

| | | |
|---|---|---|
| 53162 | 7/1973 | Japan . |
| 15980 | 2/1975 | Japan . |
| 53-189 | 4/1977 | Japan . |
| 204940 | 11/1983 | Japan . |
| 129957 | 6/1984 | Japan . |
| 38561 | 9/1985 | Japan . |
| 126388 | 6/1986 | Japan . |
| 200344 | 9/1986 | Japan . |

*Primary Examiner*—Edward K. Look

*Attorney, Agent, or Firm*—Antonelli, Terry, Stout & Kraus

[57] ABSTRACT

A drive control system for a hydraulic construction machine, comprises a prime mover driven by a hydraulic pump, at least one hydraulic actuator driven by hydraulic fluid discharge from the hydraulic pump, first rotational speed setting arrangement including a first operating arrangement for setting rotational speed of the prime mover, and a second operating arranngement for controlling operation of the hydraulic actuator (3). A second rotational speed setting arrangement is associated with the second operating arrangement for outputting a rotational speed control signal increasing the set rotational speed of the prime mover when displacement of the second operating arrangement exceeds a predetermined value, and a rotational speed control arrangement is associated with at least the second rotational speed setting arrangement, for validating the rotational speed set by the first rotational speed setting arrangement in a first region in which displacement of the second operating arrangement is at least equal to or less than the predetermined value, and for setting a rotational speed higher than the rotational speed set by the first rotational speed setting arrangement, modified by the rotational speed control signal from the second rotational speed setting arrangement in a second region in which the displacement of the second operating arrangement is larger than the predetermined value.

13 Claims, 26 Drawing Sheets

FIG. I

DRIVE CONTROL SYSTEM FOR HYDRAULIC CONSTRUCTION MACHINE

TECHNICAL FIELD

The present invention relates to a drive control system for hydraulic construction machines such, as for example, a hydraulic excavator, a wheel loader and the like and, more particularly, to a drive control system for a hydraulic construction machine, which comprises a prime mover and a hydraulic pump driven thereby.

BACKGROUND ART

In general, a conventional drive control system for a hydraulic construction machine comprises a prime mover, a hydraulic pump driven by the prime over, a hydraulic actuator driven by discharge hydraulic fluid from the hydraulic pump, rotational speed setting means including a fuel lever for setting rotational speed of the prime mover, and an operating lever for controlling operation of the hydraulic actuator. Connected between the hydraulic pump and the hydraulic actuator is a control valve for controlling flow rate and direction of the discharge hydraulic fluid from the hydraulic pump. Operation of the operating lever controls the position of the control valve to control operation of the hydraulic actuator.

In the above conventional system, rotational speed of the prime mover or an engine is set by displacement of the fuel lever, to vary a horsepower characteristic of the engine in accordance with the set rotational speed. The maximum horsepower of the engine is determined on the basis of the horsepower characteristic. Specific fuel consumption (g/PS.h) of the engine is determined depending upon the set rotational speed and the magnitude of an operational load at that time. If, for example, the rotational speed is set to the maximum value, the specific fuel consumption is brought to the best value, at the heavy load operation in the vicinity of the maximum horsepower of the horsepower characteristic obtained by the set rotational speed. On the other hand, at the light load operation which requires only horsepower lower than the maximum horsepower, the engine rotational speed increases to a value higher than the rotational speed at the maximum horsepower of the horsepower characteristic, so that the specific fuel consumption is deteriorated. In general, at the actual operation of the hydraulic excavator, for example, the proportion of the operation which is carried out under the load excellent in the specific fuel consumption is extremely low. For example, in one operational cycle including excavating, boom raising-swing, dumping and boom lowering swing which are repeated in the mentioned order, the operations necessitating the above-mentioned maximum horsepower are only the relief excavating during the operation and the operation at acceleration at the initial stage of the swing during the operation Thus, it is not preferable from the energy-saving point of view to set the rotational speed to the maximum value.

In the drive control system of the kind referred to above, Japanese Patent Application Laid-Open No. 52-53189 has proposed an arrangement in which not only is the rotational speed of the engine set by the fuel lever, but also the engine rotational speed is interlocked with the operating lever for controlling operation of the hydraulic actuator in such a manner that when the operating lever is operated, the engine rotational speed is set also by displacement of the operating lever, to vary the horsepower characteristic, thereby controlling the maximum horsepower. With this arrangement, when displacement of the operating lever is small, the engine rotational speed is set to a low value to give the maximum horsepower required for the light load operation, while as the displacement increases, the engine rotational speed is set to a high value to raise also the maximum horsepower of the engine so as to give the maximum horsepower required for the heavy load operation. Thus, the operation is carried out always in a region excellent in the specific fuel consumption, thereby preventing deterioration of the specific fuel consumption. Further, in a similar drive control system, Japanese Patent Application Laid-Open No. 58-204940 has proposed an arrangement in which only a specific operating lever is interlocked with the engine rotational speed, and only when the operating lever is operated, the engine rotational speed is set by displacement of the operating lever to vary the horsepower characteristic, thereby controlling the maximum horsepower. In this system, low rotational speed providing the maximum horsepower required for the light load operation is set by the fuel lever and, usually, the operation is carried out with the horsepower characteristic obtained at the low set rotational speed. When the specific operating lever is operated, the rotational speed is set, in interlocked relation to the operation of the operating lever, to a value higher than that set by the fuel lever, so as to give the maximum horsepower required for the heavy load operation with the horsepower characteristic obtained at the set rotational speed, like the above-described conventional system. Thus, the operation is carried out always in a region excellent in the specific fuel consumption, thereby preventing deterioration of the specific fuel consumption.

Furthermore, in the drive control system described above, Japanese Patent Application No. 59-129957 has proposed an arrangement comprising, in place of the control valve, a hydraulic pump of variable capacity type and means for varying an angular position of a swash plate of the hydraulic pump, that is, a displacement volume of the hydraulic pump by the operating lever, wherein the engine rotational speed is controlled only by the operating lever, the engine rotational speed is set to a low value when displacement of the operating lever is equal to or lower than a predetermined value, and as the displacement of the operating lever exceeds the predetermined value, the rotational speed is set to a high value in dependence upon the displacement of the operating lever, also in this system, like the above-mentioned conventional system, an attempt can be made to improve the specific fuel consumption, because, in the displacement of the operating lever equal to or larger than the predetermined value, the engine rotational speed is set on the basis of the displacement of the operating lever.

In addition to the above-mentioned patent applications, Japanese Patent Application Laid-Open Nos. 48-53162 and 50-15980, and Japanese Patent Publication No. 60-38561 are listed as being relevant to the arrangement in which the engine rotational speed is interlocked with operation of the operating lever. Moreover, U.S. Pat. Ser. No. 947,524 (corresponding to EPC Application No. 86118113.9) discloses an arrangement in which the engine rotational speed is controlled in response to operation modes or the actuator load.

In the system disclosed in Japanese Patent Application Laid-Open Nos. 52-53189 and 58-204940, however, operation of the operating lever setting the engine rotational speed by the operating lever is effected substantially over the entire range of the operating lever. Accordingly, each time displacement of the operating lever varies by operation thereof, the set rotational speed varies, so that the engine rotational speed frequently fluctuates during almost all of a period of time within which the operating lever is operated. In, for example, the above-mentioned operational cycle, when the fuel lever is operated to set the rotational speed to a low value suitable for the operation which is minimum in the requisite horsepower, operation of the operating lever causes the engine rotational speed to frequently fluctuate at the operations other than the operation. This requires power for accelerating a flywheel of the engine, resulting in consumption of the fuel. Thus, there has been a problem that the specific fuel consumption is not necessarily improved. Further, there have also been problems relating to smoke emission and noises which occur due to fluctuation of the engine rotational speed.

Moreover, the system disclosed in Japanese Patent Application Laid-Open No. 58-204940 has the following problem. That is, when an operating lever other than the specific operating lever is operated, the rotational speed set by the fuel lever is low and, therefore, it is impossible to carry out the operation necessitating the output power equal to or higher than the maximum horsepower obtained with the horsepower characteristic at the set rotational speed. Thus, a bad influence is exerted upon the operability. Specifically, for example, in the above-mentioned operational cycle, when an operating lever carrying out the boom raising-swing operation is selected as the specific operating lever, the requisite maximum horsepower cannot be obtained at the relief excavating of the operation In other words, it is impossible for the operating lever other than the specific operating lever to effectively utilize the maximum horsepower of the engine.

Furthermore, in the system disclosed in Japanese Patent Application No. 59-129957, the arrangement is such that the engine rotational speed is set to a constant low value in a region of operation of the operating lever equal to or less than the predetermined displacement. Since, however, the constant value is fixedly determined, the operating lever must be operated with displacement equal to or larger than the predetermined value to set the engine rotational speed to a higher value, at the operation necessitating the maximum horsepower higher than that obtained with the horsepower characteristic of the set low rotational speed. Also in this case, the engine rotational speed frequently fluctuates, giving rise to problems such as deterioration of the specific fuel consumption, smoke emission and generation of noises. For example, in the above-mentioned operational cycle, when the constant rotational speed is set to a low value suitable for the operation lowest in the requisite horsepower, operation of the operating lever causes the engine rotational speed to frequently fluctuate at the operations other than the operation This raises problems such as deterioration of the specific fuel consumption due to acceleration of the flywheel, smoke emission and noises. In addition, when the constant rotational speed is set to a high value, the engine rotational speed is brought to a high value inferior in the specific fuel consumption from the horsepower characteristic point of view, at the operation which necessitates only the horsepower lower than the maximum horsepower obtained with the horsepower characteristic of the constant rotational speed, thereby making it impossible to achieve the original object. That is, in the above-mentioned operational cycle, when the constant rotational speed is set to an intermediate value suitable for the usual excavating operation of and the swing operation subsequent to the initial acceleration of , the specific fuel consumption is deteriorated at the operations and which are low in requisite horsepower.

Furthermore, since the constant rotational speed is determined in a fixed fashion, even if an operator desires operation in which noises and smoke emission due to fluctuation of the rotational speed are not caused, it is impossible to carry out such desired operation. Thus, there has been a problem regarding the operability.

DISCLOSURE OF THE INVENTION

It is therefore an object of the invention to provide a drive control system for a hydraulic construction machine, which can improve the specific fuel consumption and can reduce fluctuation in rotational speed of an engine, and which is superior in operability.

The above object is achieved by a drive control system for a construction machine, comprising a prime mover, a hydraulic pump driven by the prime mover, at least one hydraulic actuator driven by discharge hydraulic fluid from the hydraulic pump, first rotational speed setting means including first operating means for setting rotational speed of the prime mover, and second operating means for controlling operation of the hydraulic actuator, second rotational speed setting means are associated with the second operating means for outputting a rotational speed control signal increasing the set rotational speed when displacement of the second operating means exceeds a predetermined value, and rotational speed control means are associated with at least the second rotational speed setting means, for validating the rotational speed set by the first rotational speed setting means in a first region in which displacement of the second operating means is at least equal to or less than the predetermined value, and for setting a rotational speed higher than the rotational speed set by the first rotational speed setting means, modified by the rotational speed control signal from the second rotational speed setting means in a second region in which the displacement of the second operating means is larger than the predetermined value.

With the above-described arrangement, in the first region in which the rotational speed set by the first rotational speed setting means is validated, the rotational speed of a desirable level in compliance with the displacement of the first operating means is set. Accordingly, since it is possible to optionally set the maximum horsepower in the first region in accordance with the operational contents, the specific fuel consumption can be improved. Further, since, in the second region, the rotational speed is set by the second operating means to the value higher than the rotational speed set by the first rotational speed setting means, the maximum horsepower suitable for the heavy load operation can be obtained, making it possible to carry out the heavy load operation under the optimum specific fuel consumption. Moreover, since, in the first region, setting of the rotational speed by the second operating means is not carried out, the rotational speed does not fluctuate even if the second operating means is operated, so that no problems arise regarding smoke emission and noises due to the fluctuation of the rotational speed. Accordingly, it is possible to reduce fluctuation of the rotational speed of the prime mover due to the second operating means as a whole in the operation, so that problems are diminished such as deterioration of the specific fuel consumption, smoke emission and noises due to the fluctuation of the rotational speed. Moreover, since the first rotational speed setting means can optionally set the rotational speed of a level suitable for the operational contents in the first region, it is possible to secure excellent operability.

BEST MODE FOR CARRYING OUT THE INVENTION

Preferred embodiments of the invention will be described below with reference to the drawings.

Figure 1:
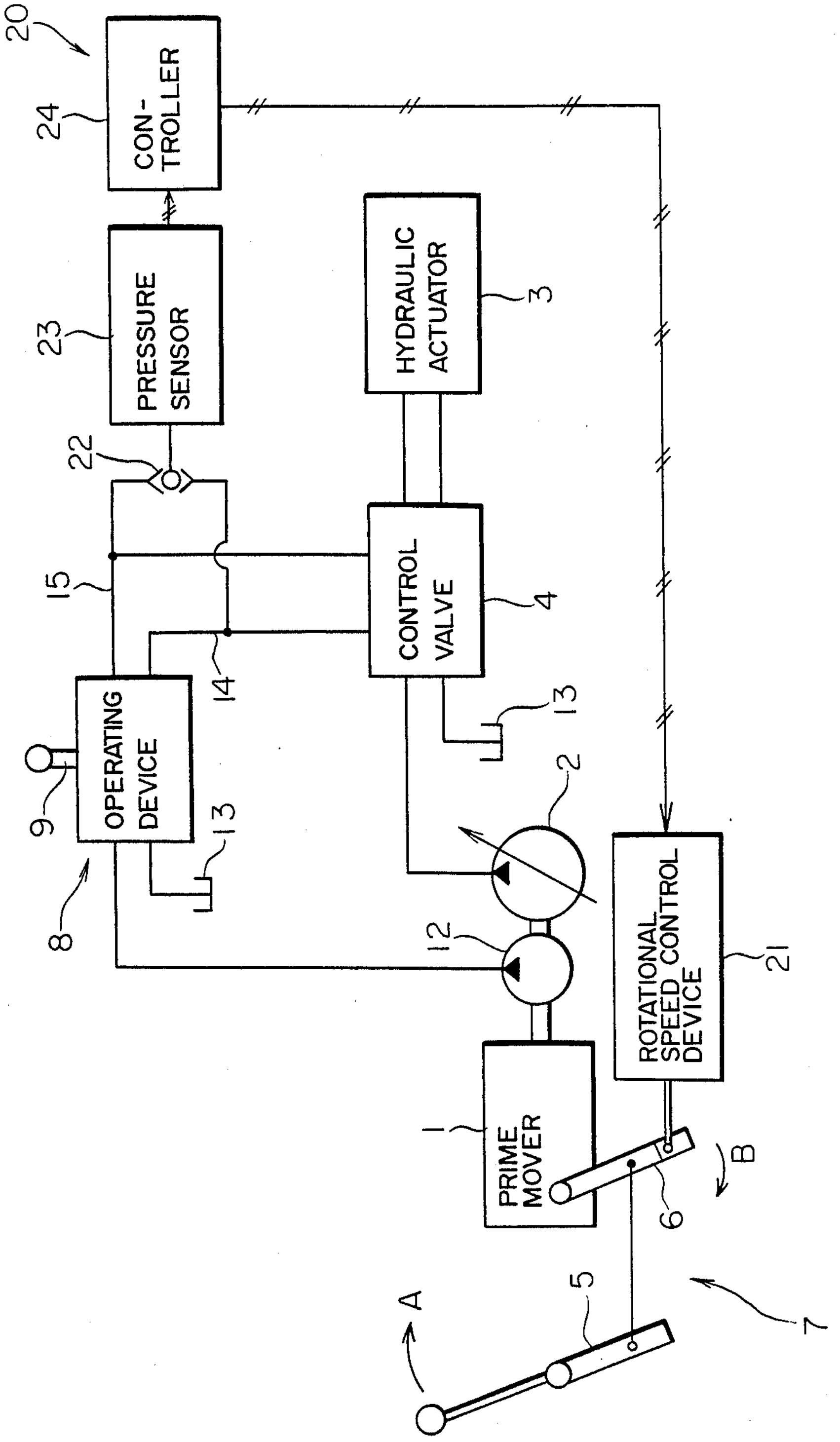
FIG. 1 is a diagrammatic view the of a drive control system for a hydraulic construction machine according to a first embodiment of the invention.

Referring now to the drawings wherein like reference numerals are used throughout the various views to designate like parts and, more particularly, to FIG. 1, according to this Figure, a drive control system for a hydraulic construction machine, according to a first embodiment of the invention. The drive control system comprises a prime mover or an engine 1, a hydraulic pump 2 driven by the engine 1, and a hydraulic actuator 3 driven by fluid discharged from the hydraulic pump 2. A control valve 4 is connected between the hydraulic pump 2 and the hydraulic actuator 3, for controlling flow rate and direction of the hydraulic fluid supplied from the hydraulic pump 2 to the hydraulic actuator 3.

The prime mover 1 is preferably a diesel engine which comprises a fuel injection system provided with an all-speed governor. In order to set rotational speed of this engine, a first rotational speed setting device generally designated by the reference numeral 7 is provided, which is composed of a first operating device or a fuel lever 5, and a governor lever 6 operatively connected to the fuel lever 5. In this first rotational speed setting device 7, as the fuel lever 5 is operated in a direction of the arrow A, the governor 6 lever is operated in a direction of the arrow B in response to the operation of the fuel lever 5, so that the rotational speed is set to a value in compliance with displacement of the fuel lever 5.

Figure 2:
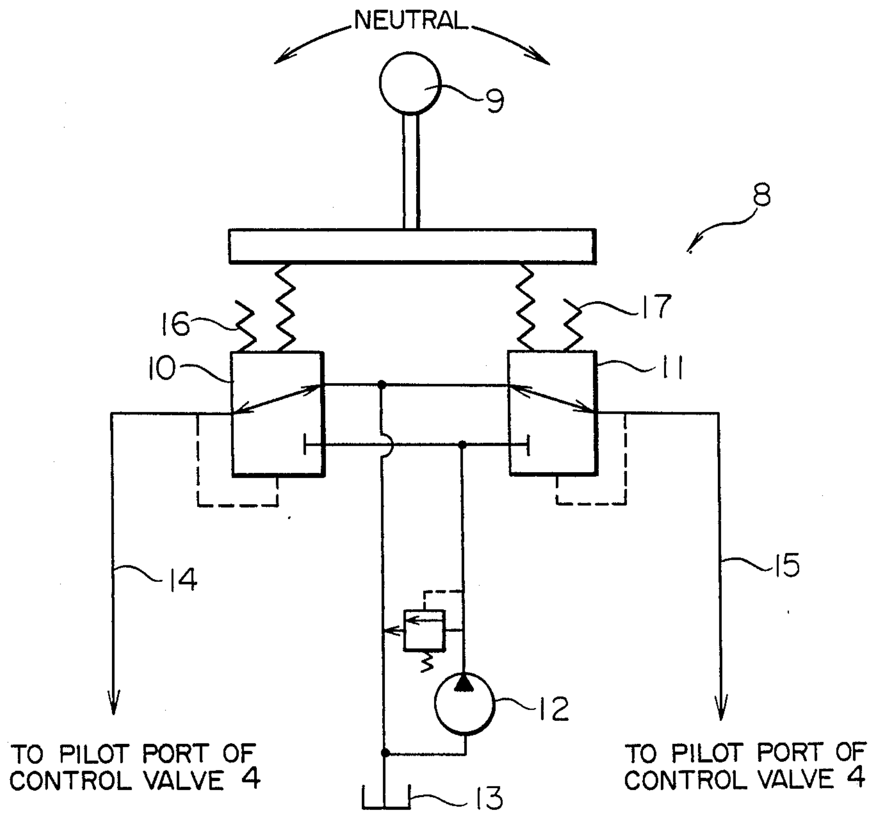
FIG. 2 is a detailed view of an operating device in the drive control system.

The operation of the hydraulic actuator 3 is controlled by a second operating device generally designated by the reference numeral 8 which, as shown in FIG. 2, comprises an operating lever 9 and two hydraulic pilot valves 10 and 11. The hydraulic pilot valves 10 and 11 have their respective primary ports which are connected to a pilot pump 12 driven by the engine 1 and to a reservoir 13. Secondary ports of the respective hydraulic pilot valves 10 and 11 are connected respectively to pilot ports of the control valve 4 through respective pilot lines 14 and 15. The arrangement is such that the pilot valves 10 and 11 are supplied with primary pressure from the pilot pump 12, and secondary pressures in accordance with displacements of the respective pilot valves 10 and 11 are supplied respectively to the pilot ports of the control valve 4. In response to receipt of the secondary pressures, the control valve 4 is controlled in position, that is, in stroke amount and direction, thereby controlling the flow rate and the direction of the hydraulic fluid supplied to the hydraulic actuator 3 to control the operation of the same.

The second operating device 8 is also provided with springs 16 and 17 which serve to increase lever operating force when displacement of the operating lever 9, that is, an operating amount thereof exceeds a predetermined value $X_0$. By the springs, as the operating amount of the lever 9 is brought to a value equal to or higher than $X_0$, the operating force becomes heavy to thereby inform an operator of the position of the operating lever 9.

Associated with the second operating device 8 is a second rotational speed setting device generally designated by the reference numeral 20 which outputs a rotational speed control signal increasing the set rotational speed of the engine 1 as the displacement exceeds the predetermined value $X_0$. A rotational speed control device 21 is associated with the second rotational speed setting device 20.

The second rotational speed setting device 20 is composed of a pressure sensor 23 connected to the pilot lines 14 and 15 through a shuttle valve 22, for detecting the maximum pressure, and a controller 24 formed by a microcomputer or the like. A detecting signal from the sensor 23 is inputted into the controller 24, and the controller 24 executes a predetermined operation processing to obtain the above-mentioned rotational control signal and outputs the same. The controller has inputted beforehand therein a control program as shown by a flow chart in FIG. 4, inclusive of the above predetermined value $X_0$.

Figure 3:
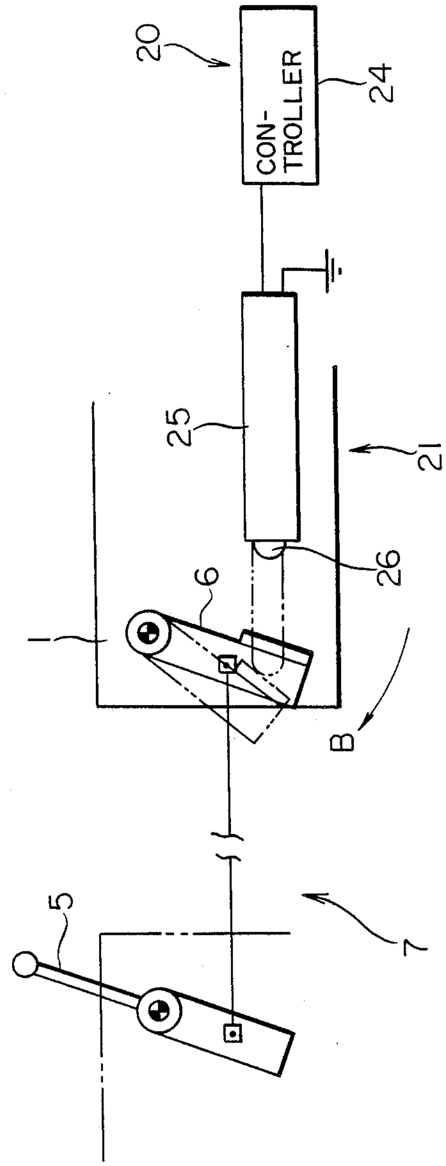
FIG. 3 is a detailed view of a rotational speed control device in the drive control system.

As shown in FIG. 3, the rotational speed control device 21 includes, for example, of a linear solenoid cylinder 25 adapted to extend a piston 26 in accordance with a level of the rotational control signal from the controller 24, to operate the governor lever 6 in the direction of the arrow B.

Figure 4:
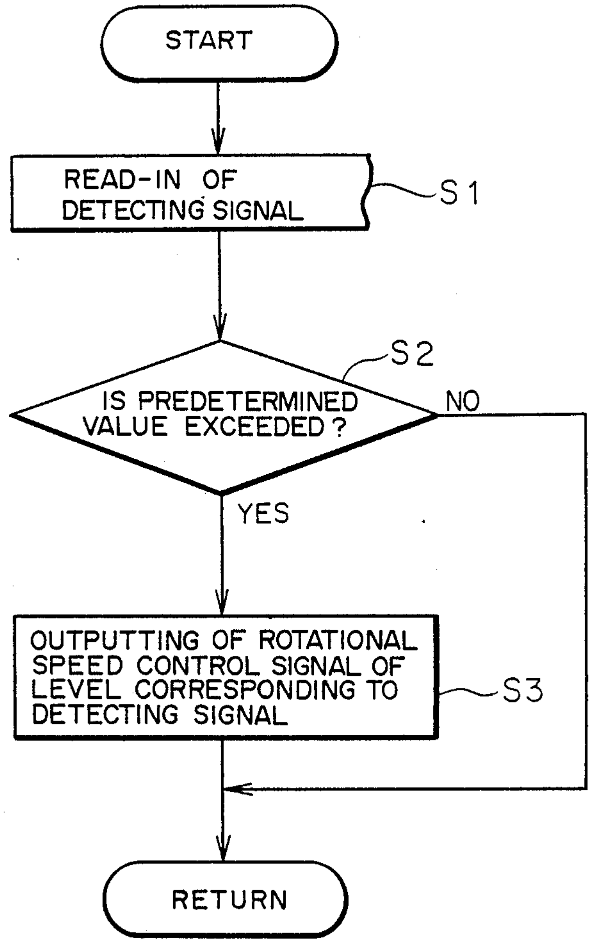
FIG. 4 is a flow chart for explanation of operation of a controller in the drive control system.

As shown in FIG. 4, the program starts, the detecting signal from the pressure sensor 23 is read into the controller 24 at a step $S_1$. At a step $S_2$, it is judged by the controller 24 whether or not displacement of the operating lever 9 indicated by the detecting signal exceeds the above-mentioned predetermined value $X_0$ which is set beforehand. If it is not judged that the displacement exceeds the predetermined value $X_0$, the program skips a step $S_3$ and is returned to the start (step $S_1$). Accordingly, the rotational speed control signal is not outputted from the controller 24, and the linear solenoid cylinder 25 shown in FIG. 3 is not actuated. Thus, the governor lever 6 is operated only by the fuel lever 5, so that the rotational speed set by the fuel lever 5 is validated. On the other hand, if it is judged at the step $S_2$ that the displacement of the operating lever 9 exceeds the predetermined value $X_0$, the program proceeds to the step $S_3$ where the rotational speed control signal of a level corresponding to the read-in detecting signal is outputted. This rotational speed control signal is sent to the linear solenoid cylinder 25, to proportionally control the stroke amount of the piston 26. Thus, the governor lever 6 is operated by the linear solenoid cylinder 25, so that the rotational speed set by the controller 24 is validated.

Figure 5:
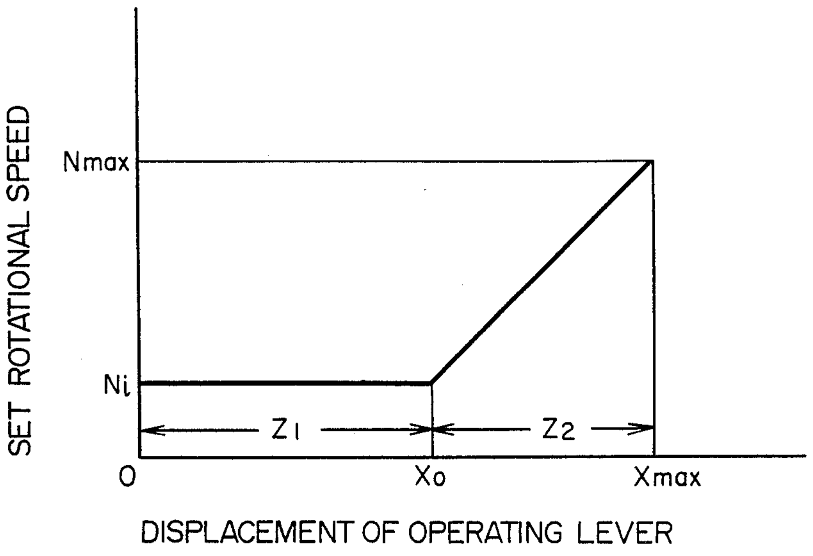
FIGS. 5 and 6 are characteristic graphs showing the relationship between displacement of an operating lever and set rotational speed of an engine in the drive control system.
Figure 6:
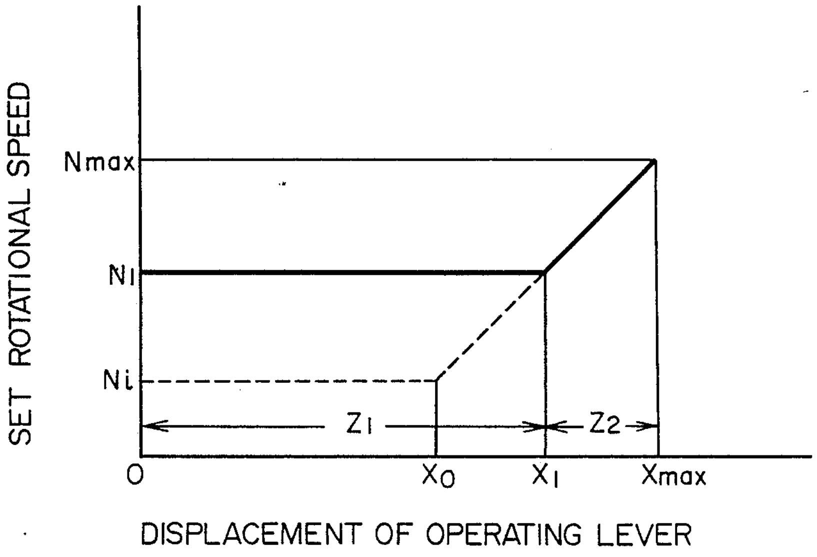

With the arrangement described above, when the rotational speed of the engine 1 is set to an idling $N_i$ by the fuel lever 5, as shown in FIG. 5, the set rotational speed at the idling $N_i$ is maintained until the displacement of the operating lever 9 reaches the predetermined value $X_0$. As the displacement exceeds $X_0$, the set rotational speed of the engine increases in proportion to displacement of the operating lever 9, and reaches the maximum value $N_{max}$ at the maximum displacement $X_{max}$. When the engine rotational speed is set to an intermediate value $N_1$ by the fuel lever 5, as shown in FIG. 6, the set rotational speed being to increase as the displacement of the operating lever 9 exceeds a value $X_1$ at which a set rotational speed $N_1$ is obtained.

In this manner, the rotational speed control device 21 is so arranged as to validate the rotational speed set by the first rotational speed setting device 7 in a first region $Z_1$ in which the displacement of the second operating device 8 is at least equal to or less than the above predetermined value $X_0$, that is, is equal to or less than the predetermined value $X_0$ or the displacement $X_1$ larger than the predetermined value. In addition, the rotational speed control device 21 sets a rotational speed higher than the rotational speed set by the first rotational speed setting device 7, modified by the rotational speed control signal from the second rotational speed setting device 20 in a second region $Z_2$ in which the displacement is larger than the value $X_0$ or $X_1$. Particularly in this embodiment, the rotational speed control device 21 is so arranged as to validate the set rotational speed indicated by the rotational speed control signal from the second rotational speed setting device 21 in the second region $Z_2$.

Advantageous effects of the drive control system constructed as above will next be described.

Figure 7:
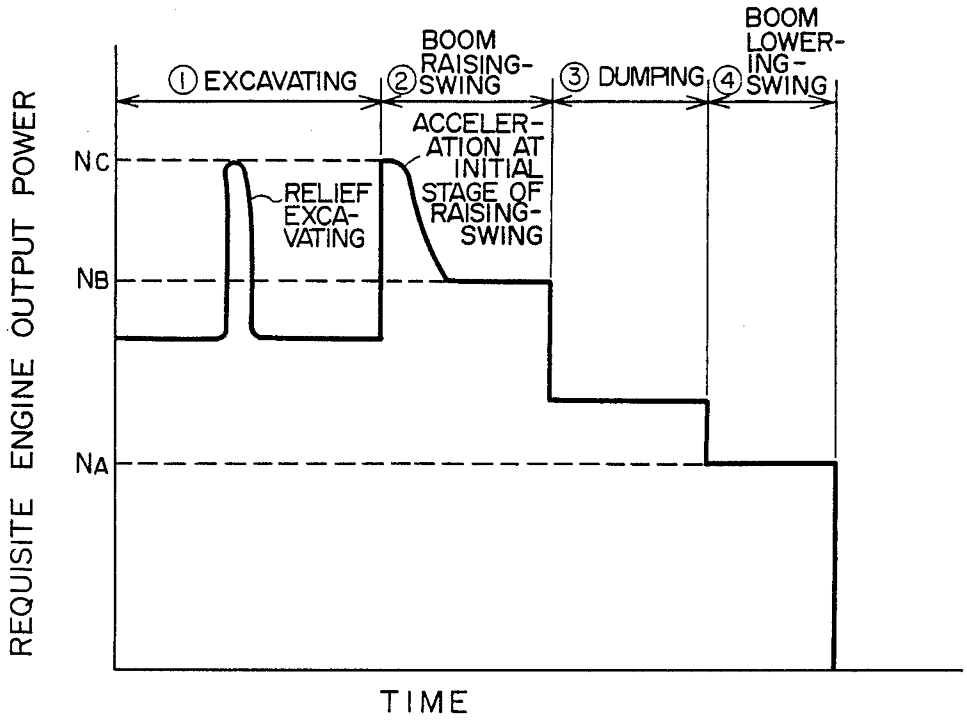
FIG. 7 is a graphical representation of a requisite engine output power in one operational cyclic, for explanation of the operation of the drive control system.

FIG. 7 is a graphical representation of one operational cycle which is a typical example of the operation conducted by the hydraulic excavator, in which excavating, boom raising-swing, dumping and boom lowering-swing are repeated in the mentioned order. FIG. 7 shows the one operational cycle in relation to the engine output power required for each operation.

In FIG. 7, $N_A$ is a set rotational speed of the engine suitable for giving the output power required for the light load operation, $N_B$ is a set rotational speed suitable for giving the output power required for the usual heavy load operation, and $N_C$ is a set rotational speed suitable for giving the output power required for especially heavy load operation. Further, FIG. 8 shows an output horsepower characteristic, a torque characteristic and a specific fuel consumption when the engine rotational speed is set to a selected one of the above values $N_A$, $N_B$ and $N_C$.

Figure 8:
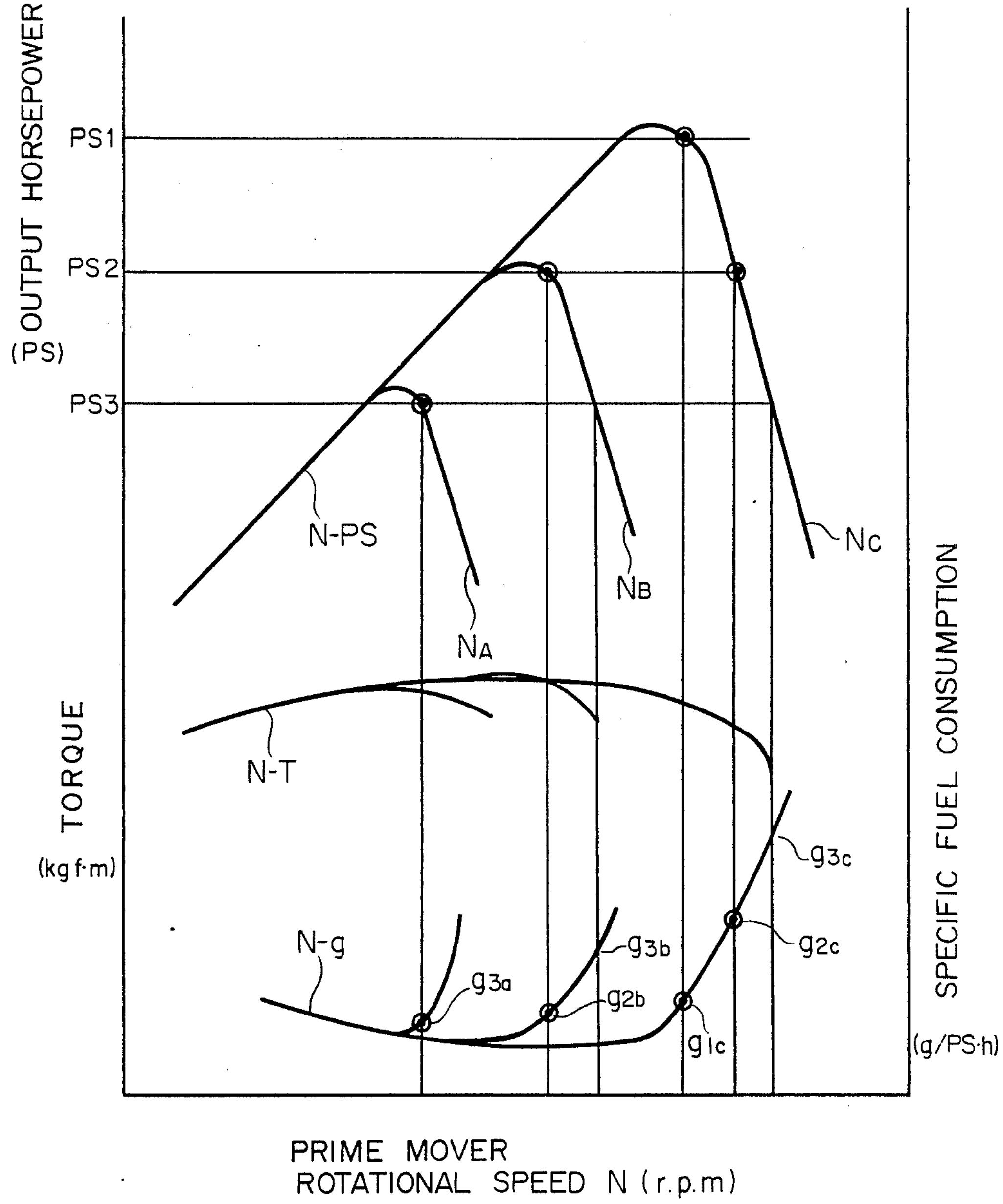
FIG. 8 is a graphical representation of characteristics of respective output horsepower, torque and specific fuel consumption when the rotational speed of the engine is varied.

In the one operational cycle shown in FIG. 7, when the engine rotational speed is set to a constant value of the highest one $N_C$, the specific fuel consumption is brought to a value $g_{1c}$ and is excellent, at the relief excavation of the operation and at acceleration at the initial stage of the swing in the operation , as shown in the operation as shown in FIG. 8. At other operations, for example, at usual swing in the operation the specific fuel consumption is brought to a value $g_{2c}$, and at boom lowering swing in the operation the specific fuel consumption is brought to a value $g_{3c}$. Thus, the specific fuel consumption is deteriorated. Accordingly, if the rotational speed is set by the fuel lever to the value $N_A$ suitable for the operation , and if the engine rotational speed is set to appropriate values in dependence upon the respective operations in interlocked relation to the operating lever, the specific fuel consumption is raised, for example, to $g_{2b}$ and $g_{3g}$. In this case, however, the engine rotational speed frequently fluctuates in interlocked relation to operation of the operating lever, during almost all of the period of time of the operations other than the boom lowering-swing operation, so that energy is consumed to accelerate the flywheel of the engine. This is not preferable in the specific fuel consumption. There also exist problems of smoke emission and noises due to fluctuation of the engine rotational speed.

In the drive control system of the embodiment described above, the rotational speed is set to a value of a desirable level in dependence upon displacement of the fuel lever 5 in the first region $Z_1$. By doing so, in the above-mentioned operational example, the engine rotational speed is set to the value $N_B$ by the fuel lever 5, whereby the specific fuel consumption in the vicinity of $g_{2b}$ is obtained at the usual excavating of and at the usual swing of and an excellent specific fuel consumption in the vicinity of $g_{3b}$ as compared to the fuel consumption in the vicinity of $g_{3c}$ is obtained at the dumping of and at the boom lowering-swing of On the other hand, since, in the second region $Z_2$, the rotational speed is set to the higher value by the operating lever 9, the rotational speed of the engine is set by operation of the operating lever 9 at the relief excavating of and at acceleration at the initial stage of the swing of , to obtain a higher set rotational speed, whereby the specific fuel consumption of $g_{1c}$ is obtained. In this manner, it is possible to obtain excellent specific fuel consumption as a whole.

Since, in the first region Z , setting of the rotational speed by the operating lever 9 is not carried out, the rotational speed does not fluctuate even if the operating lever 9 is operated. Thus, fluctuation of the engine rotational speed is reduced as a whole, so that energy consumption due to acceleration of the flywheel can be ignored, and the problems of smoke emission and noises due to fluctuation of the engine rotational speed are diminished.

Further, if an operator desires the operation in which noises and smoke emission due to fluctuation of the engine rotational speed are completely eliminated, setting of the engine rotational speed by the fuel lever 5 is brought to the maximum value $N_C$, whereby the aforesaid operation can be realized. Thus, the operability is improved.

Additionally, in practice, the above-mentioned predetermined value $X_0$ is determined in consideration of the following points.

The first point is as follows. When the engine rotational speed is set by the fuel lever 5 to a value in the vicinity of the idling $N_i$ which is employed in the lightest load operation such as normal plane operation or the like, the discharge quantity of the hydraulic pump 2 is determined by the rotational speed. On the other hand, as the operating lever 9 is operated, the control valve 4 begins to be opened in dependence upon displacement of the operating lever, and the requisite flow rate required by the control valve and the flow rate of fluid passing through the control valve flowing at the discharge quantity of the hydraulic pump are brought into coincidence with each other at a certain specific opening degree of the control valve. Thus, the first point is to bring the displacement of the operating lever 9 indicating the specific opening degree to $X_0$. That is, the displacement of the operating lever 9 is brought to a value obtaining the opening degree of the control valve 4 at which the flow rate of fluid passing through the control valve 4 obtained by restricting the discharge quantity of the hydraulic pump 2 is brought into coincidence with the requisite flow rate. By doing so, it is made possible to secure the first and second regions $Z_1$ and $Z_2$ shown in FIGS. 5 and 6, at substantially the entire set rotational speed. Thus, the engine rotational speed can be set in interlocked relation to the operating lever in a region equal to or higher than the predetermined value $X_0$ or $X_1$.

The second point is the displacement of the operating lever 9 which obtains a valve opening degree corresponding to an upper limit of a metering region of the control valve 4 required for the fine or minute operation working. By the displacement, it is made possible to secure the metering characteristic as designed, which is not influenced by rise in the engine rotational speed in a region equal to or lower than the predetermined value $X_0$. Thus, the desirable fine operation working can be carried out.

As another point, there is displacement of the operating lever 9 giving the predetermined value $X_0$ at which the problems of smoke emission and noises in the region equal to or higher than the predetermined value $X_1$ are minimized, in consideration of every operational contents.

In the above-described embodiment, the displacement of the operating lever 9 and the set rotational speed of the engine are brought to the linear proportional relationship in the second region $Z_2$ as shown in FIGS. 5 and 6, but are not limited only to this relationship. For example, the arrangement may be such that the opening degree of the control valve 4 is calculated on the basis of displacement of the operating lever 9, and an engine rotational speed control signal is outputted which can obtain discharge quantity of the hydraulic pump 2 corresponding to the requisite flow rate prescribed by the opening degree. In this case, the engine rotational speed increases in predetermined functional relation other than the linear proportion to the displacement of the operating lever.

In the above embodiment, it has been described that the rotational speed control signal outputted from the controller 24 is increased proportionally in dependence upon displacement of the operating lever 9, and the linear solenoid cylinder 25 is employed which is operated with a stroke amount on the basis of the signal. As a result, as shown in FIGS. 5 and 6, the predetermined value forming the boundary between the first and second regions $Z_1$ and $Z_2$ is changed from $X_0$ to $X_1$ in dependence upon the rotational speed set by the fuel lever 5, and the set rotational speed increases in response to displacement of the operating lever 9 in the second region $Z_2$. However, an arrangement different from the above embodiment in this respect can be employed.

Figure 9:
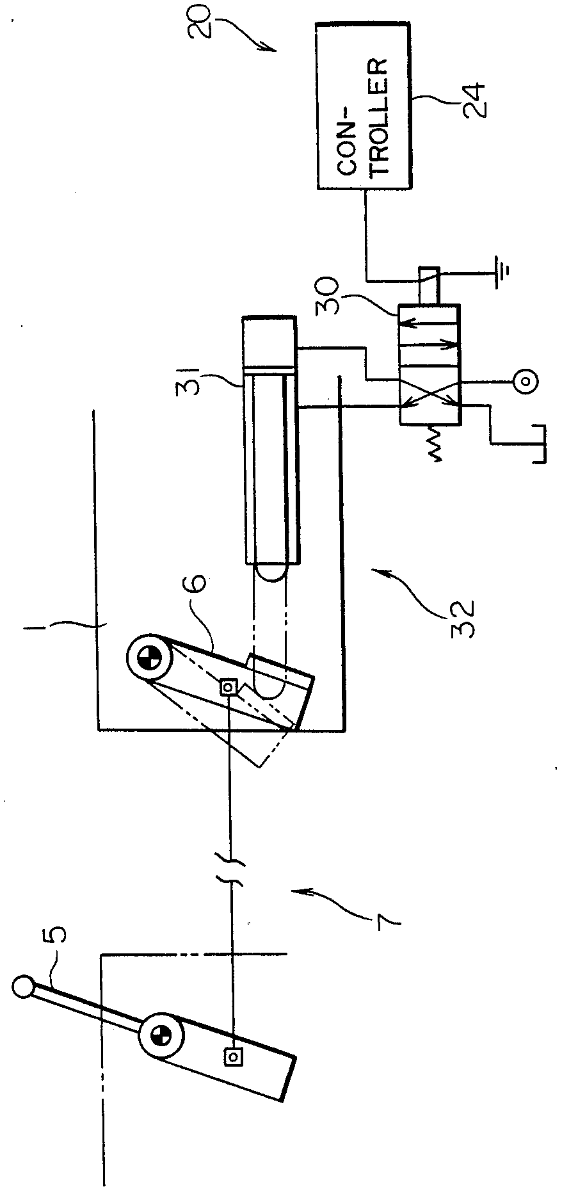
FIG. 9 is a diagrammatic view showing a modification of the rotational speed control device.
Figure 10:
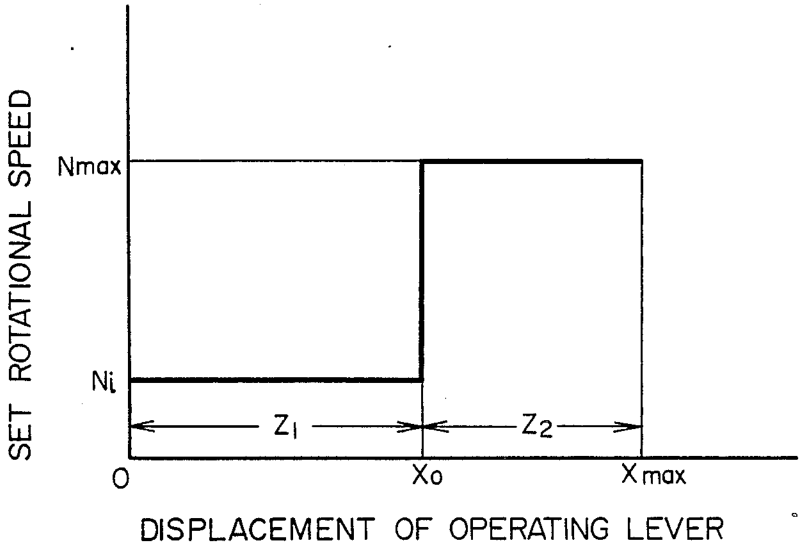
FIGS. 10 and 11 are characteristic graphs showing the relationship between displacement of the operating lever and the set rotational speed of the engine when the rotational speed control device illustrated in FIG. 9 is employed.
Figure 11:
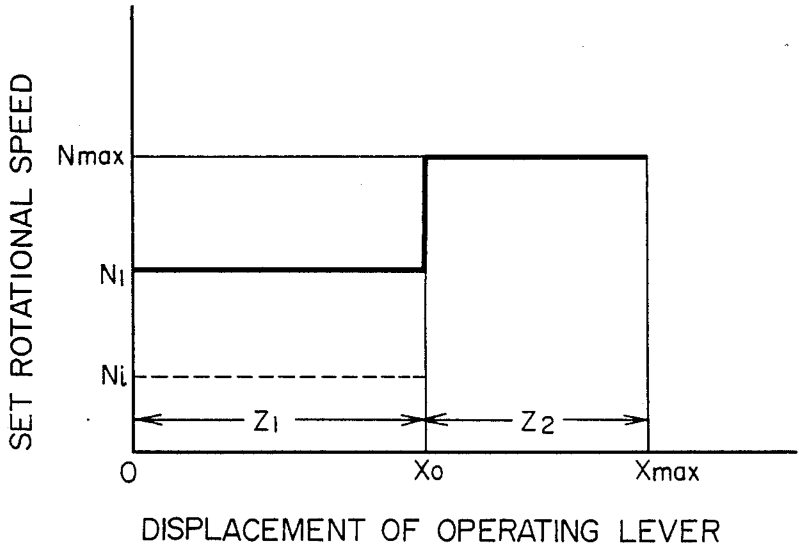

That is, the rotational speed control signal outputted from the controller 24 at displacement equal to or larger than the predetermined value $X_0$ is set to a constant value, and the rotational speed control device 21 is formed, in place of the linear solenoid cylinder 25, by a solenoid cylinder of ON-OFF type which extends to the maximum stroke when the rotational speed control signal reaches the constant value. Moreover, as shown in FIG. 9, a rotational speed control device 32 may be composed of an electromagnetic directional control valve 30 turned on and off in response to the rotational speed control signal, and a hydraulic cylinder 31 movable between ON and OFF positions in accordance with the position of the directional control valve 30. In this case, the relationship between displacement of the operating lever 9 and the set rotational speed of the engine is brought to one as shown in FIG. 10 of the rotational speed set by the fuel lever 5 is the idling $N_i$, and to one as shown in FIG. 11 if the rotational speed set by the fuel lever 5 is the intermediate rotational speed $N_1$. That is, the predetermined value forming the boundary between the first and second regions $Z_1$ and $Z_2$ is $X_0$ and is constant independently of the rotational speed set by the fuel lever 5, while the set rotational speed is brought to the maximum value $N_{max}$ in the second region $Z_2$ independently of displacement of the operating lever 9. With such arrangement, the number of component parts is reduced and the structure is simplified.

Figure 12A:
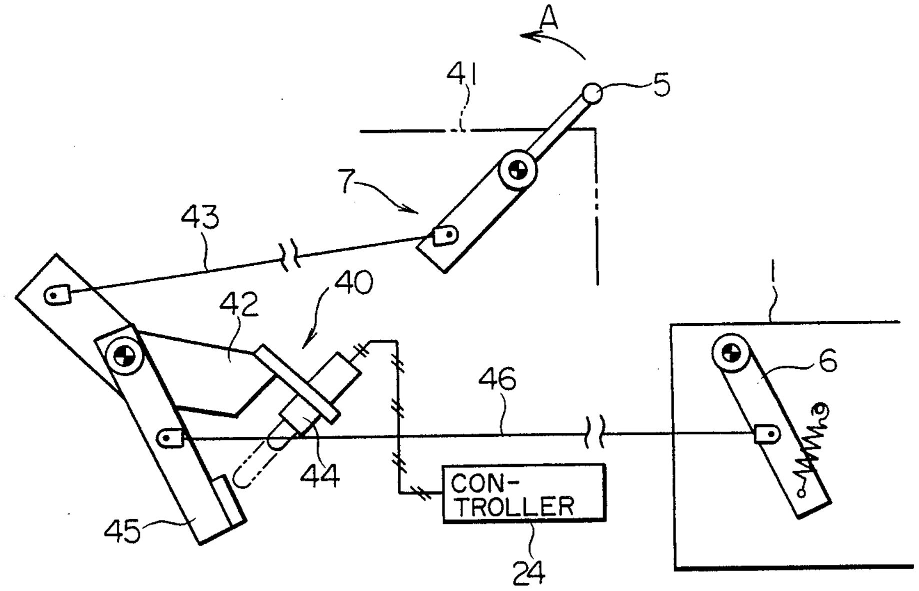
FIGS. 12(*a*), 12(*b*) and 12(*c*) are diagrammatic views respectively showing operating positions different from each other, in another modification of the rotational speed control device.
Figure 12B:
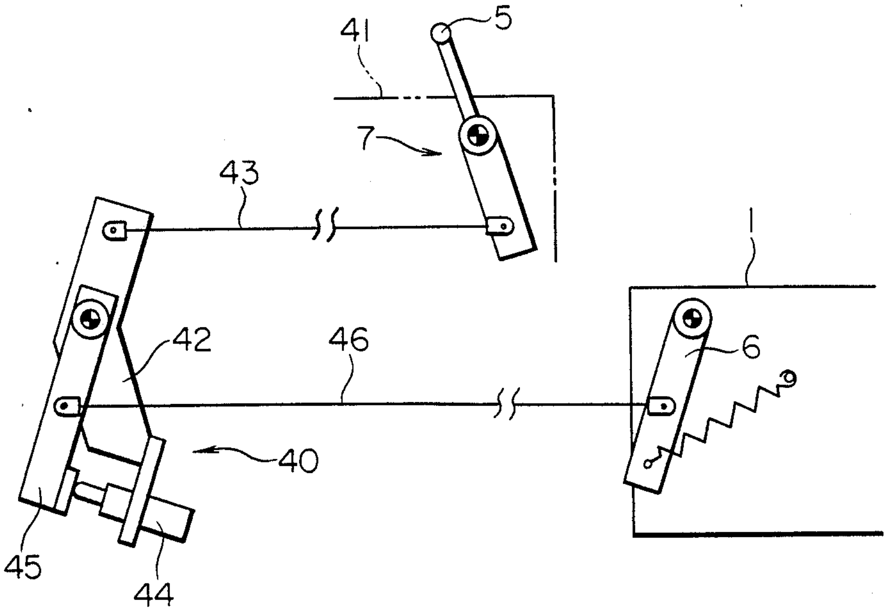
Figure 12C:
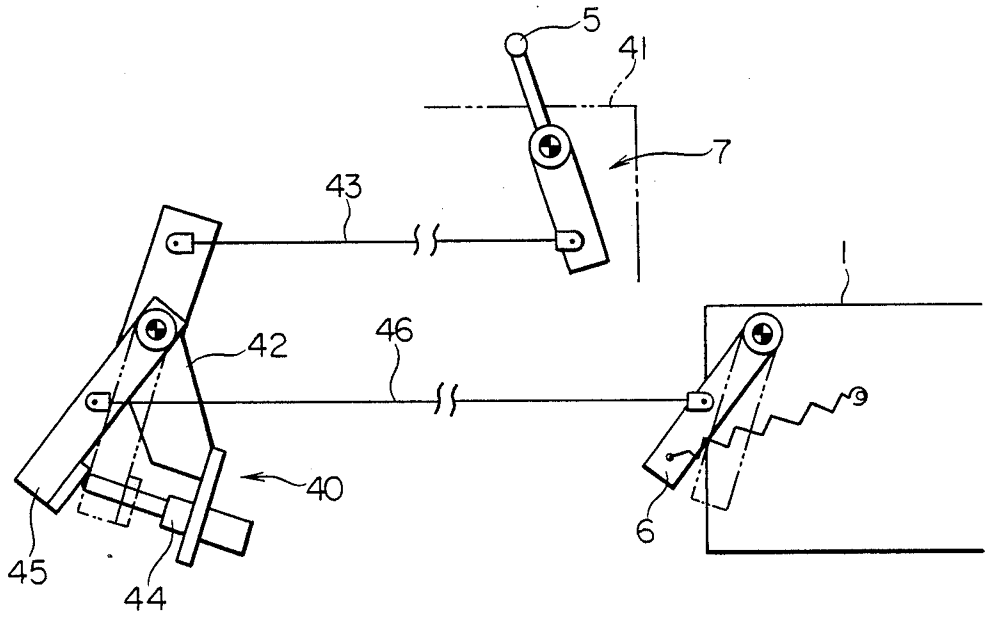

The arrangement of each of the above-described embodiments is such that the rotational speed control device 21, 32 validates the rotational speed set by the rotational speed control signal obtained by the second rotational speed setting device 20 in the second region $Z_2$. However, an arrangement different from the above arrangement also in this respect can be employed. FIGS. 12(*a*) through 12(*c*) show an embodiment having such arrangement, in which a rotational speed control device generally designated by the reference numeral 40 is so arranged as to add the rotational speed set by the rotational speed control signal to the set rotational speed obtained by the fuel lever 5 in the second region $Z_2$.

That is, as shown in FIG. 12(*a*) in which the fuel lever 5 is in the OFF-position, the fuel lever 5 is pivotally supported by a console box 41 within an operator's cab, and is connected, through a push-pull cable 43, to one end of a first intermediate lever 42 which is pivotally supported at a predetermined portion of the vehicle. The first intermediate lever 42 has the other end to which a linear solenoid cylinder 44 is fixedly mounted. A second intermediate lever 45 is pivotally supported in coaxial relation to the first intermediate lever 42. Pivotal movement of the first intermediate lever 42 is transmitted to the second intermediate lever 45 through the linear solenoid cylinder 44. The second intermediate lever 45 is connected to the governor lever 6 through a push-pull cable 46. The rotational speed control signal is supplied from the controller 24 of the second control setting means 20 to the linear solenoid cylinder 44, so that a stroke amount corresponding to the magnitude of the signal is obtained at the linear solenoid cylinder 44.

An idling position is a position where pivotal movement of the fuel lever 5 in the direction A causes the forward end of the linear solenoid cylinder 25 to be brought into engagement with the second intermediate lever 45. In this case, as indicated by the line $l_1$ in FIG. 13, the set rotational speed of the engine 1 is a constant value $N_i$ in the first region $Z_1$ of from zero to the predetermined value $X_0$ of displacement of the operating lever 9. As the displacement of the operating lever 9 exceeds the predetermined value $X_0$, a rotational speed control value increasing in proportion to the displacement is obtained at the second rotational speed setting device 20. A rotational speed control signal corresponding to the rotational speed control valve is sent to the linear solenoid cylinder 44, so that the linear solenoid cylinder 44 extends with a stroke in dependence upon the rotational speed control signal. Thus, the set rotational speed increases in the second region $Z_2$ as indicated by the line $l_1$ in FIG. 13.

Also as shown in FIG. 12(*b*), in case where the engine rotational speed is set by the fuel lever 5 to the intermediate value $N_1$, as the displacement of the operating lever 9 increases to the maximum value $X_{max}$ beyond the predetermined value $X_0$, the linear solenoid cylinder 44 extends to the maximum stroke amount as shown in FIG. 12(*c*). Thus, the set rotational speed increases as indicated by the line 12 in FIG. 13.

Additionally, like the embodiment described with reference to FIGS. 9 and 10, the linear solenoid cylinder 44 may be formed by an actuator operable between ON and OFF positions. In this case, the relationship of the set rotational speed of the engine with respect to displacement of the operating lever 9 is brought to one shown in FIG. 14.

Figure 15:
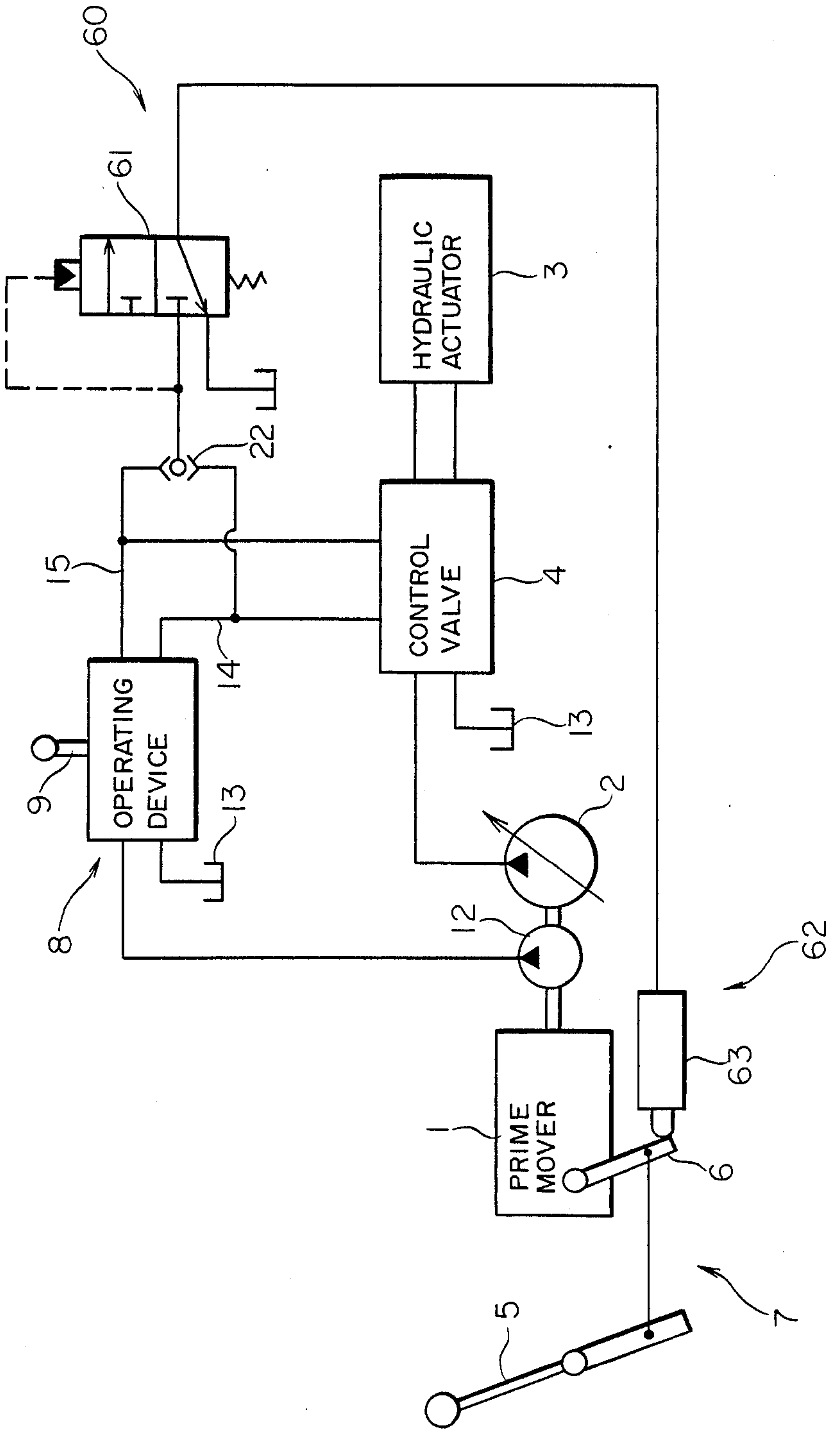
FIG. 15 is a diagrammatic view of a drive control system according to another embodiment of the invention.

The above described embodiments are directed to an example which employs the controller 24 generating the rotational speed control signal to the second rotational speed setting device 20; however, in the embodiment of FIG. 15, a second rotational speed setting device generally designated by the reference numeral 60 comprises a directional control valve 61 which is controlled in switching as the secondary pressure of the operating device 8 formed by a pilot valve exceeds a predetermined value corresponding to the predetermined value $X_0$ of displacement of the operating lever 9, and a 5 rotational speed control device generally designated by the reference numeral 62 comprises a proportional control hydraulic cylinder 63 which is extended and retracted directly by the secondary pressure of the operating device 8 transmitted through the directional control valve 61. That is, when the secondary pressure of the operating device 8 is equal to or lower than the predetermined value, the directional control valve 61 is in the illustrated position where transmission of the secondary pressure is blocked. As the secondary pressure exceeds the predetermined value, the directional control valve 61 is switched to the other position where the secondary pressure is applied to the hydraulic cylinder 63 as a rotational speed control signal, so that the hydraulic cylinder 63 is extended with a stroke amount corresponding to the pressure.

Also in the embodiment of FIG. 15, the relationship between displacement of the operating lever 9 and the set rotational speed of the engine 1 is brought to one shown in FIGS. 5 and 6 in dependence upon the rotational speed set by the fuel lever 5. If the hydraulic cylinder 63 is controlled in an ON and OFF manner, the relationship between the aforesaid displacement and the set rotational speed is brought to one shown in FIGS. 10 and 11. If the arrangement illustrated in FIGS. 12(*a*) through 12(*c*) is employed so as to add the value set by the second rotational speed setting device 60, the relationship between displacement of the operating lever and the set rotational speed is brought to one shown in FIG. 13. If control is carried out in an ON and OFF manner, the relationship is brought to one shown in FIG. 14.

Figure 16:
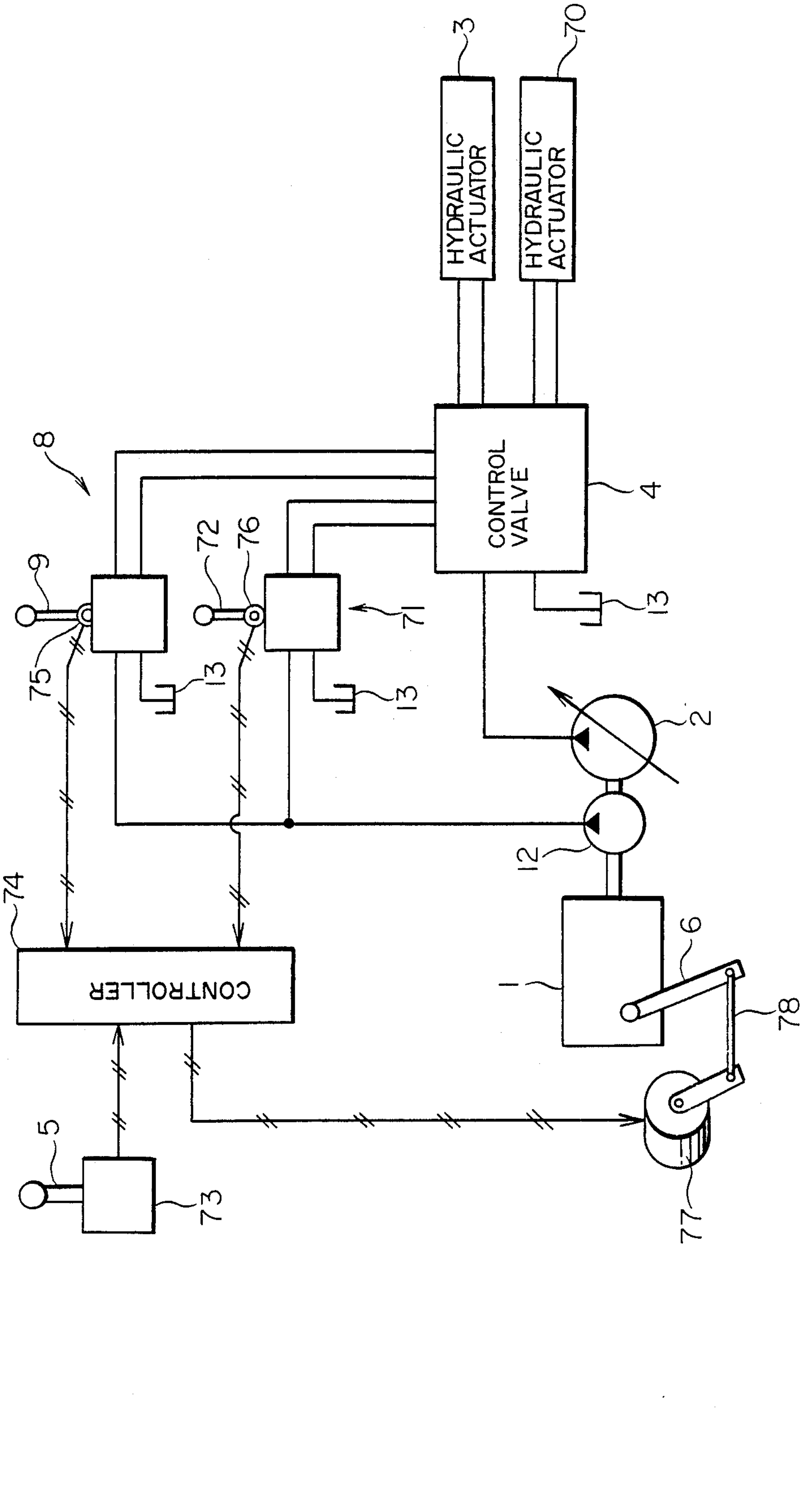
FIG. 16 is a diagrammatic view of a drive control system when the embodiment illustrated in FIG. 1 is arranged electronically.

In the above described embodiments, it has been described that one of control of the engine rotational speed by operation of the fuel lever 5 and the operating lever 9 is carried out mechanically by the first rotational speed setting device 7, and the other is carried out electronically or hydraulically by the second rotational speed setting means 20, 60 in a manner separate from the one control. However, an arrangement can be employed in which these controls are put together into a single electronic control system and are carried out thereby, as shown in FIG. 16 of FIG. 16. The embodiment includes two hydraulic actuators 3 and 70 and, correspondingly, two operating devices 8 and 71 for respectively controlling operations of the respective hydraulic actuators 30, 70, with the operating device 71 having an operating lever 72.

In the embodiment of FIG. 16, displacement of the fuel lever 5 is electrically detected by a displacement detector 73, and a signal indicative of the detection is inputted into a controller 74. Moreover, displacements of the respective operating levers 9 and 72 are also electrically detected respectively by detecting devices 75 and 76, and signals indicative of the respective detections are sent to the controller 74. The controller 74 coordinates these signals, and outputs a command signal instructing a final set rotational speed, to a pulse motor 77 which forms a rotational speed control device. The pulse motor 77 rotates by an angular extent corresponding to the command signal, to drive the governor lever 6 through a linkage 78.

Figure 17:
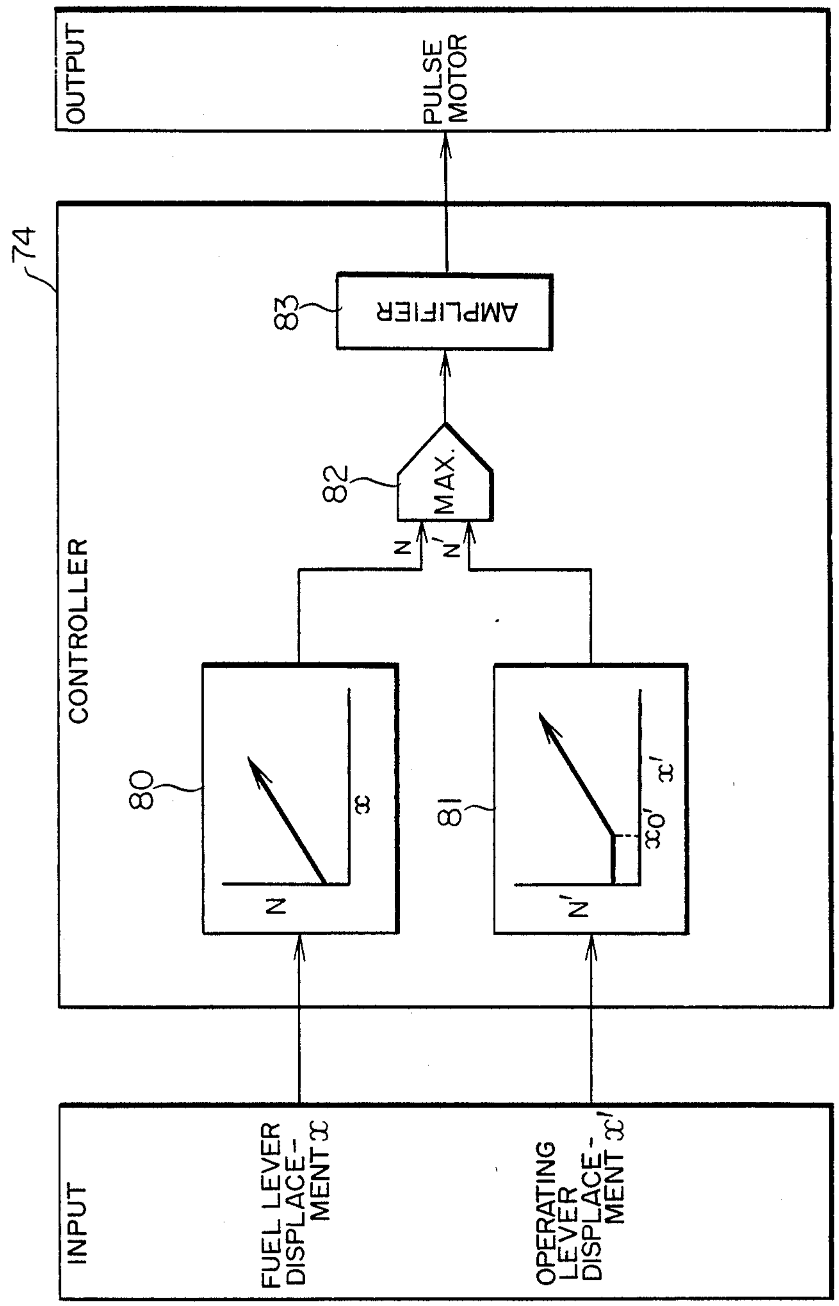
FIG. 17 is a schematic view of the contents of a controller of the drive control system illustrated in FIG. 16.

If it is desired to obtain the relationship between the operating lever displacement and the set rotational speed as shown in FIGS. 5 and 6, the controller 74 is arranged as illustrated in FIG. 17. That is, the controller 74 comprises arithmetic means 80 or first rotational speed setting means for setting the rotational speed N to a value in accordance with displacement of the fuel lever 5, arithmetic means 81 or second rotational speed control means for outputting, as a rotational speed control signal, a rotational speed N′ increasing in response to displacements of the respective operating levers 9 and 72 when their respective displacements exceed the predetermined value $X'_0$, a maximum value selector 82 for selecting the maximum value of the outputs of the respective first and second arithmetic means 80 and 81, and an amplifier 83 for amplifying an output from the maximum value selector 82, wherein the pulse motor 77 is driven by an output from the amplifier 83. In the second arithmetic means 81, the predetermined value $X'_0$ corresponds to the predetermined value $X_0$ shown in FIGS. 5 and 6.

Figure 18:
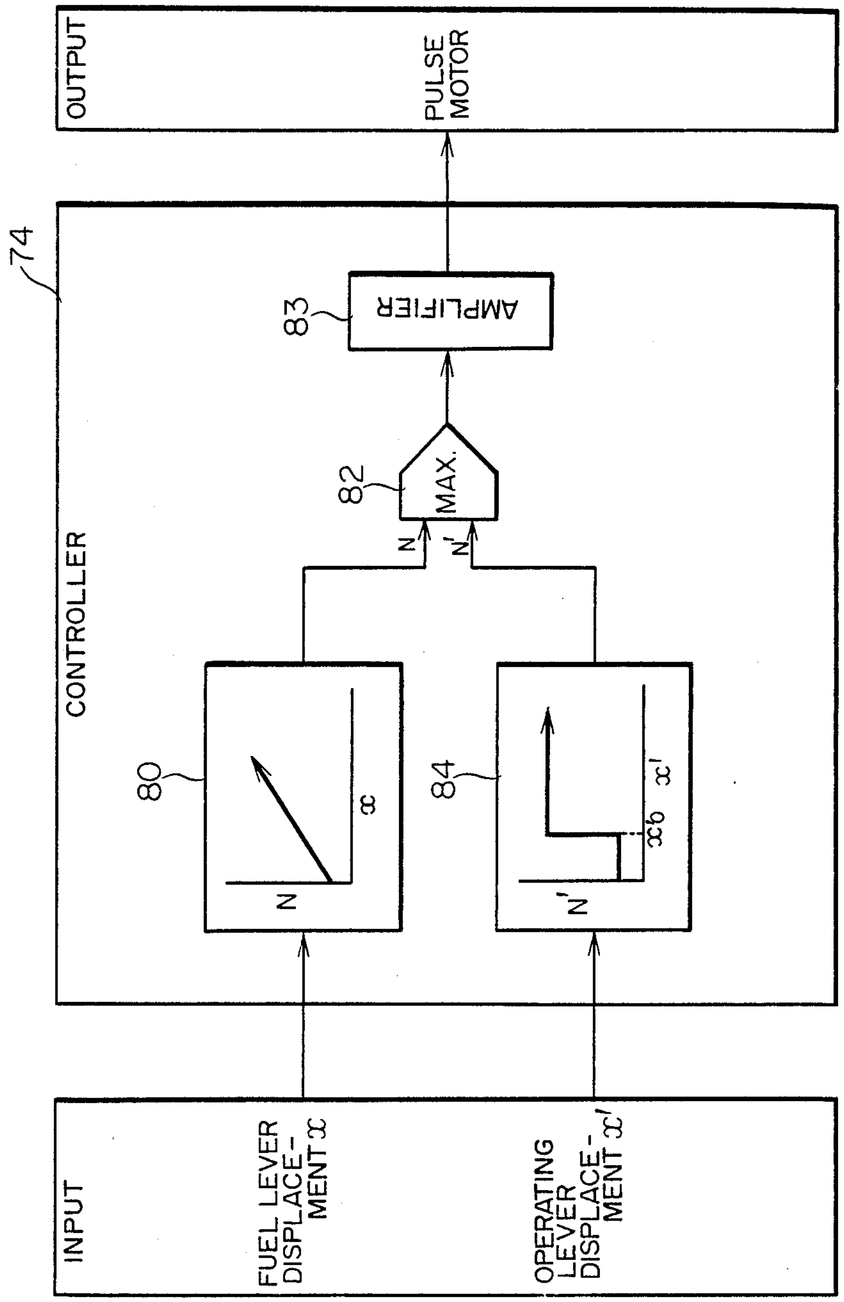
FIG. 18 is a schematic view of the contents of the controller when the characteristics illustrated in FIGS. 10 and 11 are given to the drive control system shown in FIG. 16.

If it is desired to obtain the relationship between the operating lever displacement and the set rotational speed as shown in FIGS. 10 and 11, the controller 74 is arranged as shown in FIG. 18. That is, the controller 74 comprises second arithmetic means 84 for setting a constant maximum rotational speed N′ when displacements of the respective operating levers 9 and 72 exceed the predetermined value $X'_0$, in substitution for the second arithmetic means 81 shown in FIG. 17.

Figure 13:
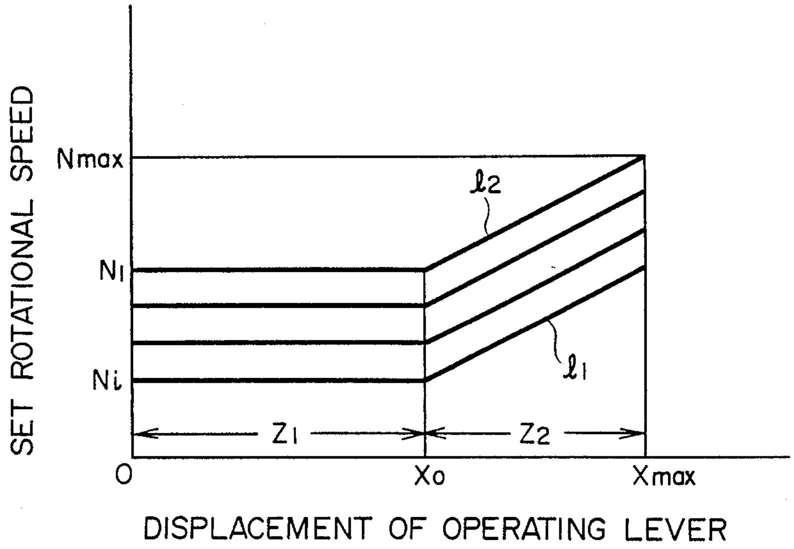
FIG. 13 is a characteristic graph showing the relationship between displacement of the operating lever and the set rotational speed of the engine when the rotational speed control device illustrated in FIGS. 12(*a*) through 12(*c*) is employed.
Figure 14:
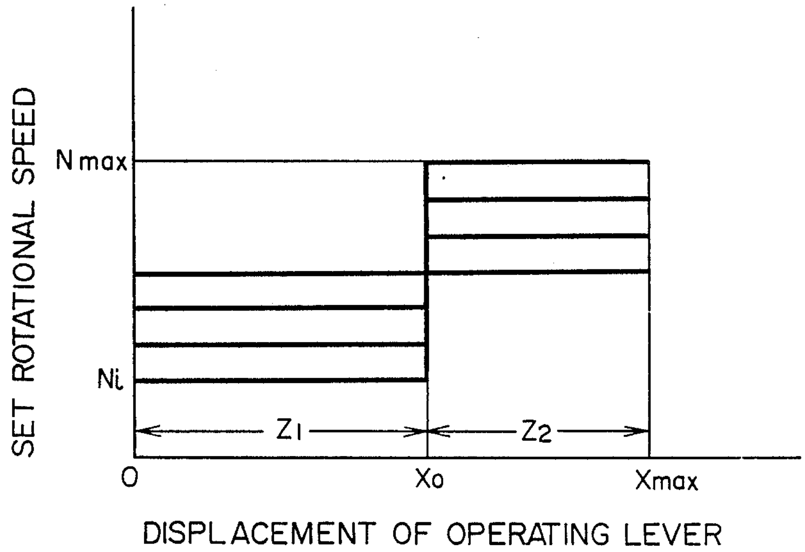
FIG. 14 is a characteristic view when the rotational speed control device is further modified.
Figure 19:
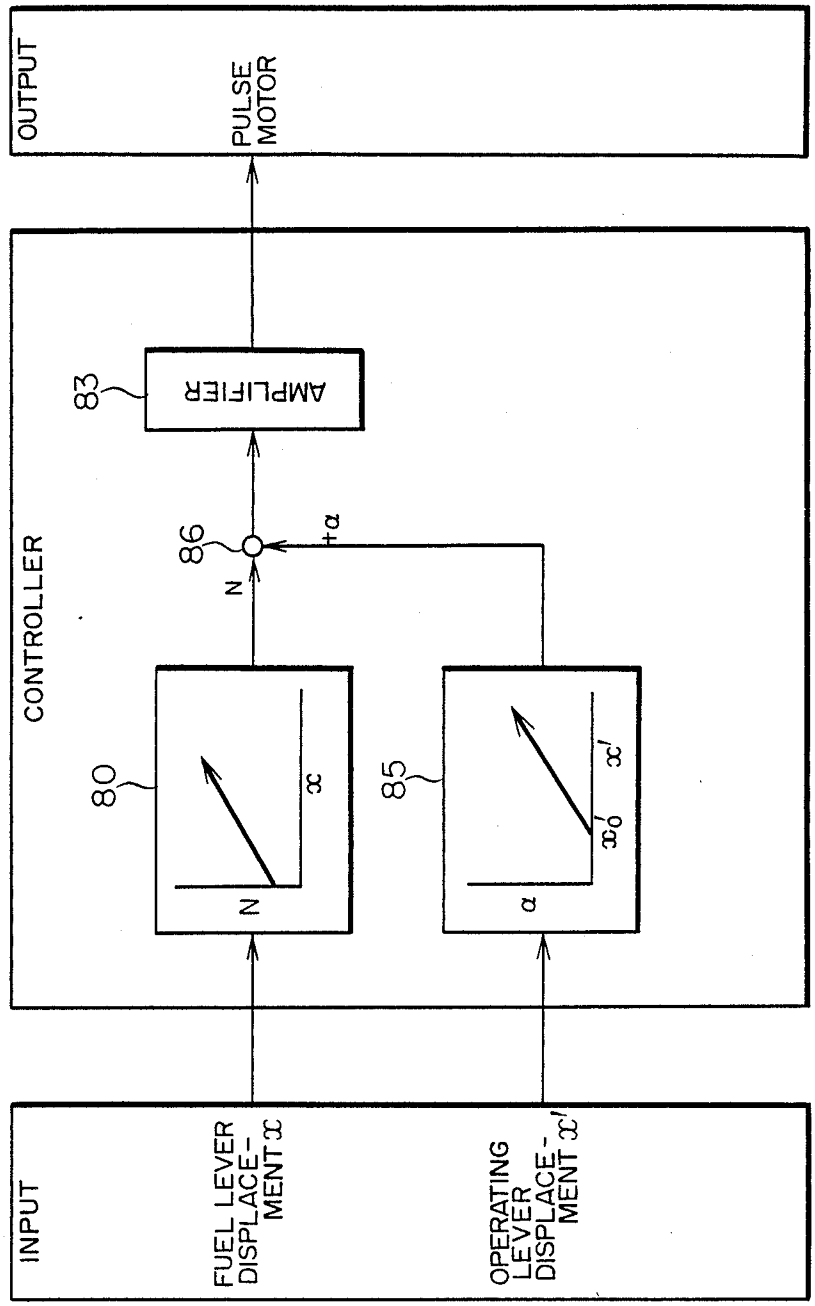
FIG. 19 is a schematic view of the contents of the controller when the characteristic illustrated in FIG. 13 is given to the drive control system shown in FIG. 16.
Figure 20:
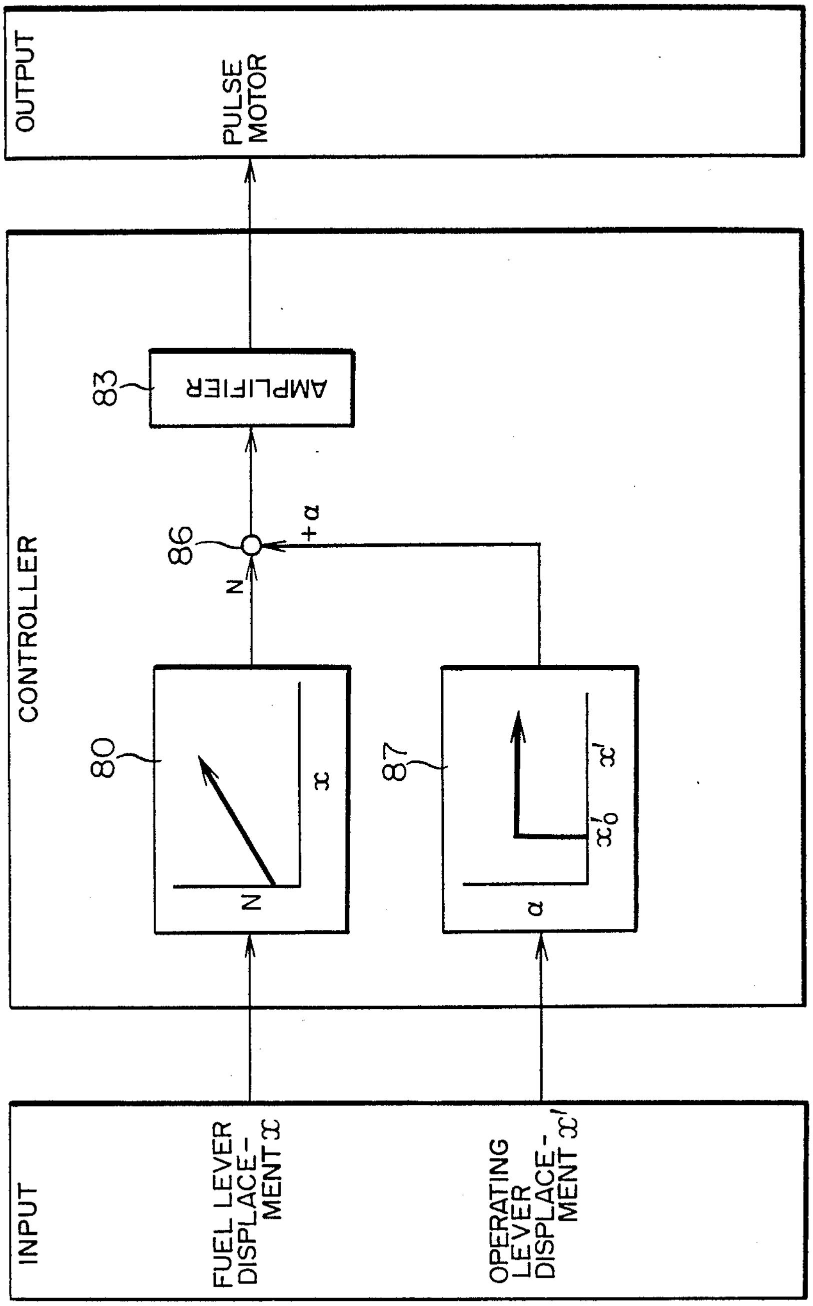
FIG. 20 is a schematic view of the contents of the controller when the characteristic illustrated in FIG. 14 is given to the drive control system shown in FIG. 16.

Likewise, if it is desired to obtain the relationship between the operating lever displacement and the set rotational speed as shown in FIG. 13, the controller 74 is arranged as illustrated in FIG. 19. In FIG. 19, in place of the second arithmetic means 81 shown in FIG. 17, second arithmetic means 85 is provided which outputs a rotational speed $\alpha$ increasing in accordance with displacements of the respective operating levers 9 and 72 as their respective displacements exceed the predetermined value $X'_0$. In addition, in place of the maximum value selector 82, an adder 86 is provided which adds the outputs from the respective first and second arithmetic means 80 and 85 to each other. Moreover, if it is desired to obtain the relationship between the operating lever displacement and the set rotational speed as shown in FIG. 14, the controller 74 is provided, as shown in FIG. 20, with second arithmetic means 87 which outputs a constant maximum rotational speed $\alpha$ as the displacements of the respective operating levers 9 and 72 exceed the predetermined value $X'_0$, in place of the second arithmetic means 85 illustrated in FIG. 19.

It will be apparent that, for the arrangement in connection with the embodiment of FIG.16 described above, it is possible to achieve functional advantages similar to those of the previously described embodiments. Further, in the embodiment of FIG. 16, since the two control systems for the respective fuel lever and the operating levers are put together electronically, the structure is simplified and it is possible to easily obtain desirable functions by rearrangement of the program.

Figure 21:
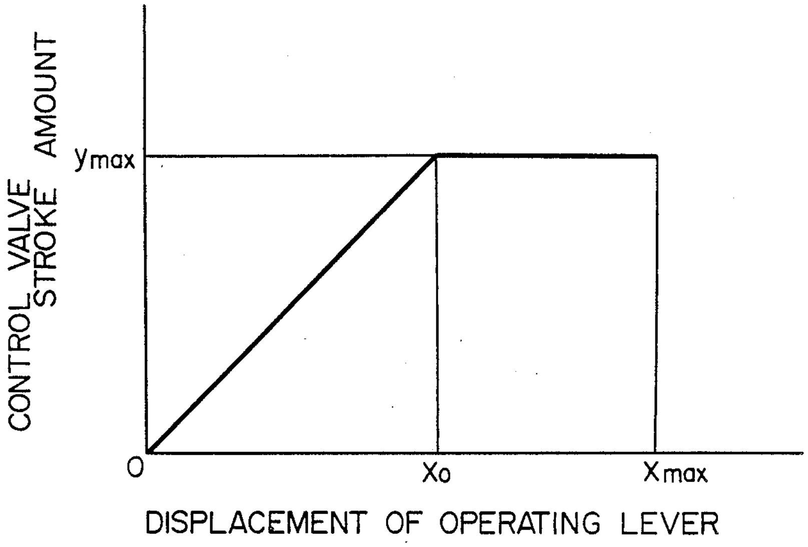
FIG. 21 is a graphical representation of the relationship between displacement of the operating lever and a stroke amount of a control valve in an embodiment in which the displacement and the stroke amount are set especially.
Figure 22:
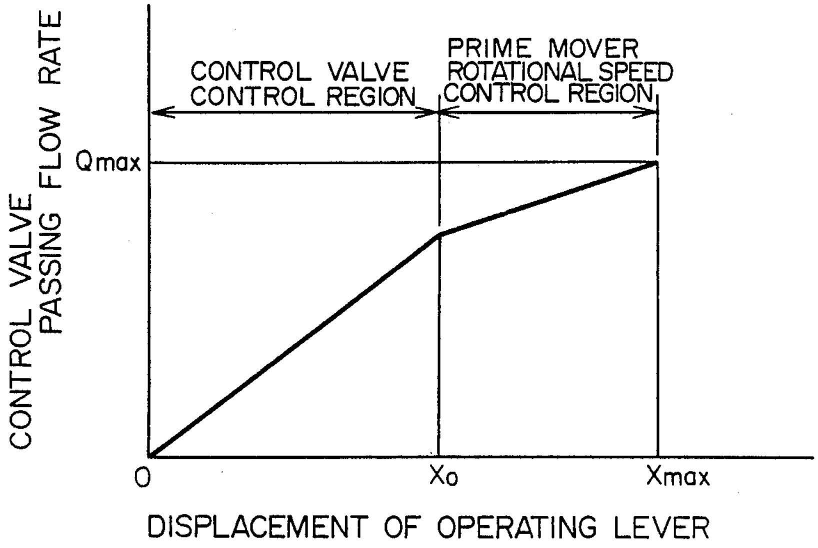
FIG. 22 is a graphical representation of the relationship between displacement of the operating lever and flow rate of fluid passing through the control valve in the embodiment illustrated in FIG. 21.

In the above described embodiments, it has been described that, the relationship between displacement of the operating lever 9 and the stroke amount determining the opening degree of the control valve 4 is set such that, the stroke amount of the control valve is so set as not to reach the maximum value when the displacement of the operating lever reaches the predetermined value $X_0$, but so as to be brought to an intermediate stroke amount. This has been referred to above at the second point as the points to be taken into consideration when the predetermined value $X_0$ is set. As shown in FIG. 21, however, setting can be made such that the stroke amount of the control valve 4 is brought to the maximum value (maximum in opening degree), when the operating lever 9 is operated up to the predetermined value $X_0$. If setting is made in this manner, the relationship between displacement of the operating lever 9 and flow rate of fluid passing through the control valve 4 is brought to one shown in FIG. 22. Thus, in a range within which the displacement of the operating lever is less than the predetermined value $X_0$, the engine rotational speed does not fluctuate due to operation of the operating lever. Accordingly, it is possible to obtain the requisite flow rate in accordance with the stroke amount (opening degree) of the control valve over the entire stroke amount thereof, so that desirable actuator speed can be obtained even at the light load operation.

In the above embodiments, it has been described that when displacement of the operating lever 9 exceeds the predetermined value $X_0$, only the engine rotational speed is controlled on the basis of the displacement.

Figure 23:
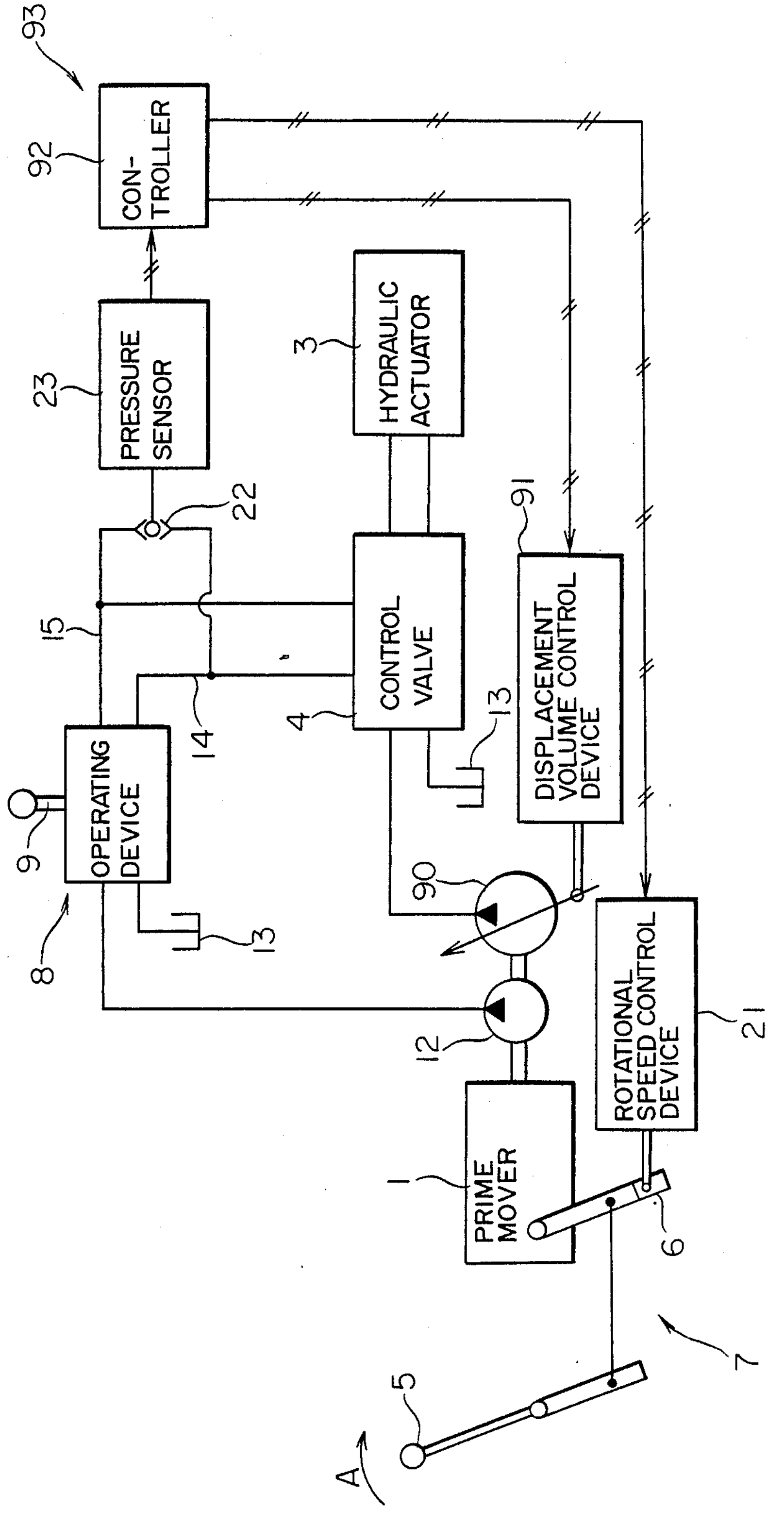
FIG. 23 a diagrammatic view showing of a drive control system according to yet another embodiment of the invention.

However, an arrangement may be employed in which a displacement volume of the hydraulic pump 2 is also controlled in the same manner shown in FIG. 23.

The arrangement of the embodiment of FIG. 23 is such that a hydraulic pump 90 of variable capacity type is employed, and a displacement volume of the hydraulic pump 90 is varied by a displacement volume control device 91 which regulates an angle of inclination of a swash plate of the hydraulic pump. Like the embodiment shown in FIG. 1, a controller 92 forms a second rotational speed setting device generally designated by the reference numeral 93 for outputting a rotational speed control signal to the rotational speed control device 21. The controller 92 also outputs a displacement volume control signal to the displacement volume control device 91. With such arrangement, as displacement of the operating lever 9 exceeds the predetermined value $X_0$, the displacement volume (angle of inclination) of the hydraulic pump 90 is reduced correspondingly to an increase in the rotational speed of the engine 1.

Figure 24:
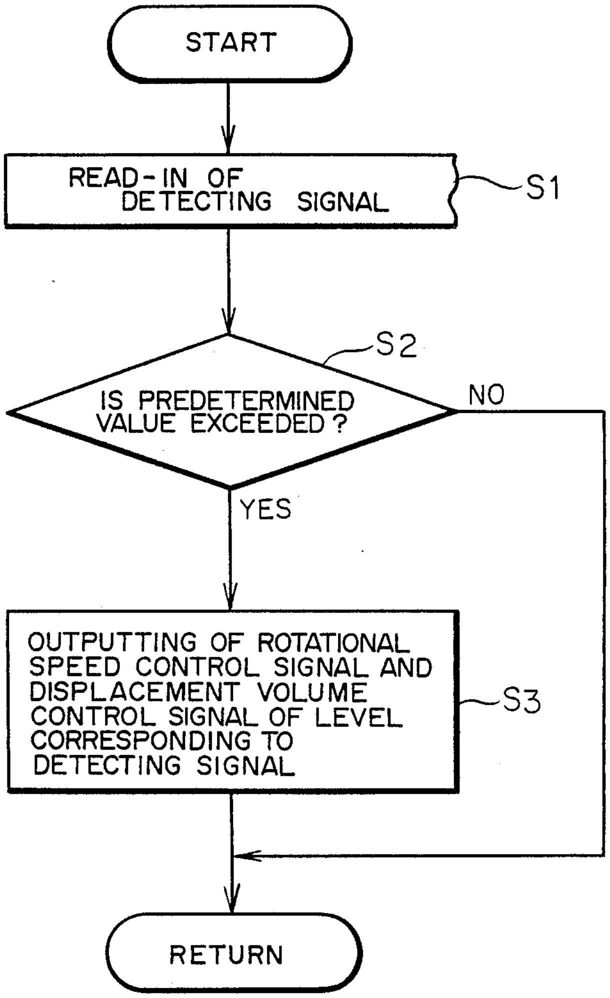
FIG. 24 is a flow chart for explanation of operation of a controller in the drive control system illustrated in FIG. 23.
Figure 25:
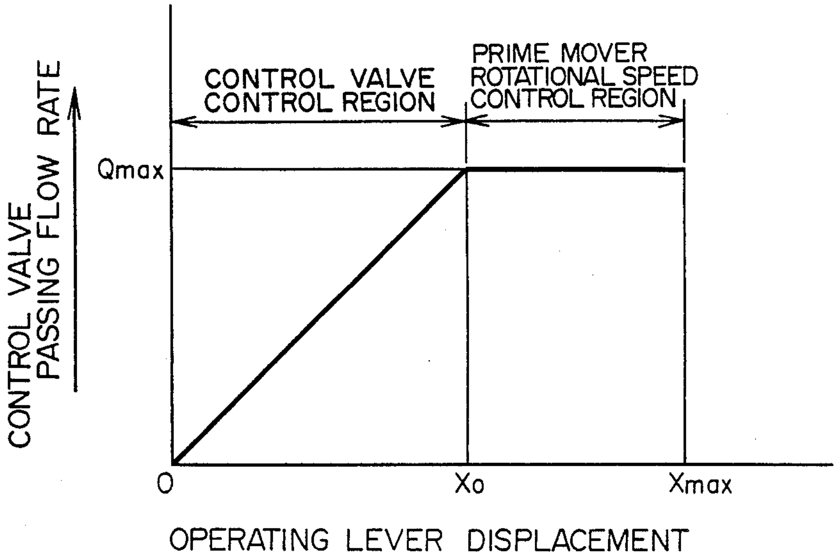
FIG. 25 is a graphical representation of the relationship between displacement of an operating lever and flow rate of fluid passing through a control valve in the drive control system illustrated in FIG. 23.

That is, the controller 92 has stored therein a control program as indicated by a flow chart in FIG. 24. At a step $S_1$, a detecting signal from the pressure sensor 23 is read into the controller 92. It is judged at a step $S_2$ whether or not displacement of the operating lever 9 indicated by the detecting signal exceeds the predetermined value $X_0$. If it is judged that the displacement exceeds the predetermined value, the rotational speed control signal increasing the set rotational speed of the engine 1 in proportion to the displacement is outputted at a step $S_3$. At the same time, the displacement volume control signal reducing the displacement volume (angle of inclination) in dependence upon the increase in the set rotational speed is outputted to the displacement volume control device 91. At this time, preferably, the displacement volume control signal is so determined as to reduce the displacement volume such that the discharge quantity of the hydraulic pump is brought substantially to a constant value with respect to the increase in the engine rotational speed. Further, like the embodiment described with reference to FIGS. 21 and 22, the arrangement of the embodiment of FIG. 23 is such that the stroke amount of the control valve 4 is brought to the maximum value, that is, the valve opening degree is brought to the maximum value, at the predetermined value $X_0$ of the operating lever displacement. By doing so, the relationship between the displacement of the operating lever 9 and the flow rate of fluid passing through the control valve 4 is brought to one shown in FIG. 25. That is, since no fluctuation exists in the set rotational speed of the engine until the predetermined value $X_0$, it is possible to obtain the passing flow rate in compliance with the requisite flow rate determined by the stroke amount (operating degree) of the control valve 4, over the entire stroke amount thereof. In a range exceeding the predetermined value $X_0$, the control valve passing flow rate is made constant by the above-mentioned control of the set rotational speed and the displacement volume. As a result, as the set rotational speed of the engine 1 is increased and decreased in response to the requisite load, it is made possible to complimentarily increase and decrease the absorption horsepower of the hydraulic pump 2 in accordance with the increase and decrease in the engine rotational speed. Thus, it is made possible to effectively utilize the engine horsepower, while the operating speed is maintained constant.

Figure 26:
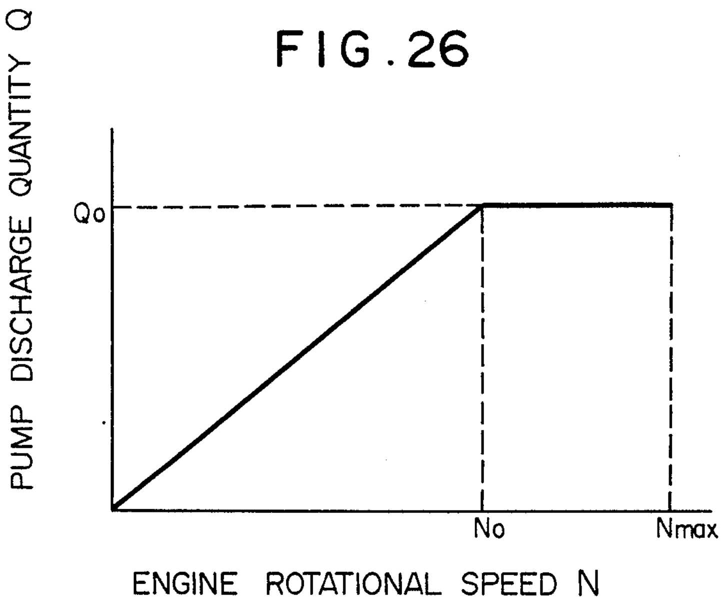
FIG. 26 is a graphical representation of the relationship between engine rotational speed and a pump discharge quantity in the drive control system illustrated in FIG. 23.
Figure 27:
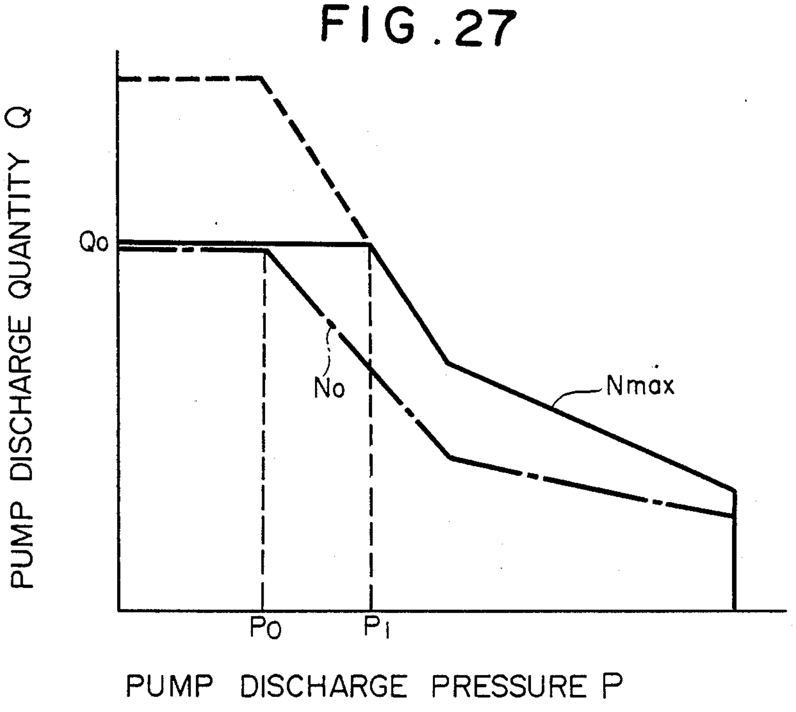
FIG. 27 is a graphical representation of the relationship between pump discharge pressure and the pump discharge quantity in the drive control system illustrated in FIG. 23.

In the embodiment of FIG. 23, as shown most clearly in FIG. 26, the discharge quantity of the hydraulic pump 90 increases in proportion to an increase in the engine rotational speed until the engine rotational speed reaches a value $N_0$ corresponding to the predetermined value $X_0$ of the operating lever displacement, because the displacement volume is constant. On and after the value $N_0$, the discharge quantity is brought to a constant value $Q_0$ until the discharge quantity reaches the maximum value $N_{max}$ as described above. The relationship between the pump discharge pressure P and the pump discharge quantity Q at this time is brought to one shown in FIG. 27. That is, the relationship indicates a P - Q characteristic as shown by the dot-and-chain line in the running condition of the rotational speed $N_0$, and indicates a P - Q characteristic as shown by the solid line in the running condition of the rotational speed $N_{max}$. In a range of from $N_0$ to $N_{max}$ of the rotational speed, the P - Q characteristic varies continuously between the dot-and-chain chain line and the solid line in response to variation in the rotational speed. At this time, the region in which the pump discharge quantity Q is constant at $Q_0$ increases from $P_0$ to $P_1$of the pump pressure, and the absorption horsepower also increase correspondingly. Even on and after the engine rotation speed $N_0$, if the pump discharge quantity is increased in proportion to the engine rotational speed as usual, the P - Q characteristic is brought to one indicated by the broken line in FIG. 27 at $N_{max}$ of the engine rotational speed.

In this manner, in the embodiment of FIG. 23, since the pump discharge quantity $Q_0$ is controlled to a constant value in the range equal to or higher than the engine rotational speed $N_0$, it is made possible to increase the consumptive horsepower correspondingly to an increase in the engine rotational speed. Thus, the engine horsepower can effectively be utilized while the operating speed is maintained constant. Further, if the control valve 4 is maintained at the maximum opening degree like the embodiment of FIG. 23 the entire pump discharge quantity can be supplied to the hydraulic actuator 3, whereby it is possible to more effectively utilize the engine horsepower.

Additionally, the displacement volume control device 91 may be composed, for example, of a hydraulic cylinder and a linear solenoid valve proportionally controlled by the signal from the controller 92.

The embodiment illustrated in FIG. 23 can also be arranged electronically, like the embodiment shown in FIG. 16. That is, a controller 95 has inputted thereinto a signal from the displacement detector 73 for detecting displacement of the fuel lever 5, and signals from the respective detecting devices 75 and 76 for detecting displacements of the respective operating levers 9 and 72. The controller 75 outputs a command signal instructing a final set rotational speed to the pulse motor 77, and outputs a displacement volume control signal to a displacement volume control device 96 formed by a linear solenoid cylinder.

Figure 29:
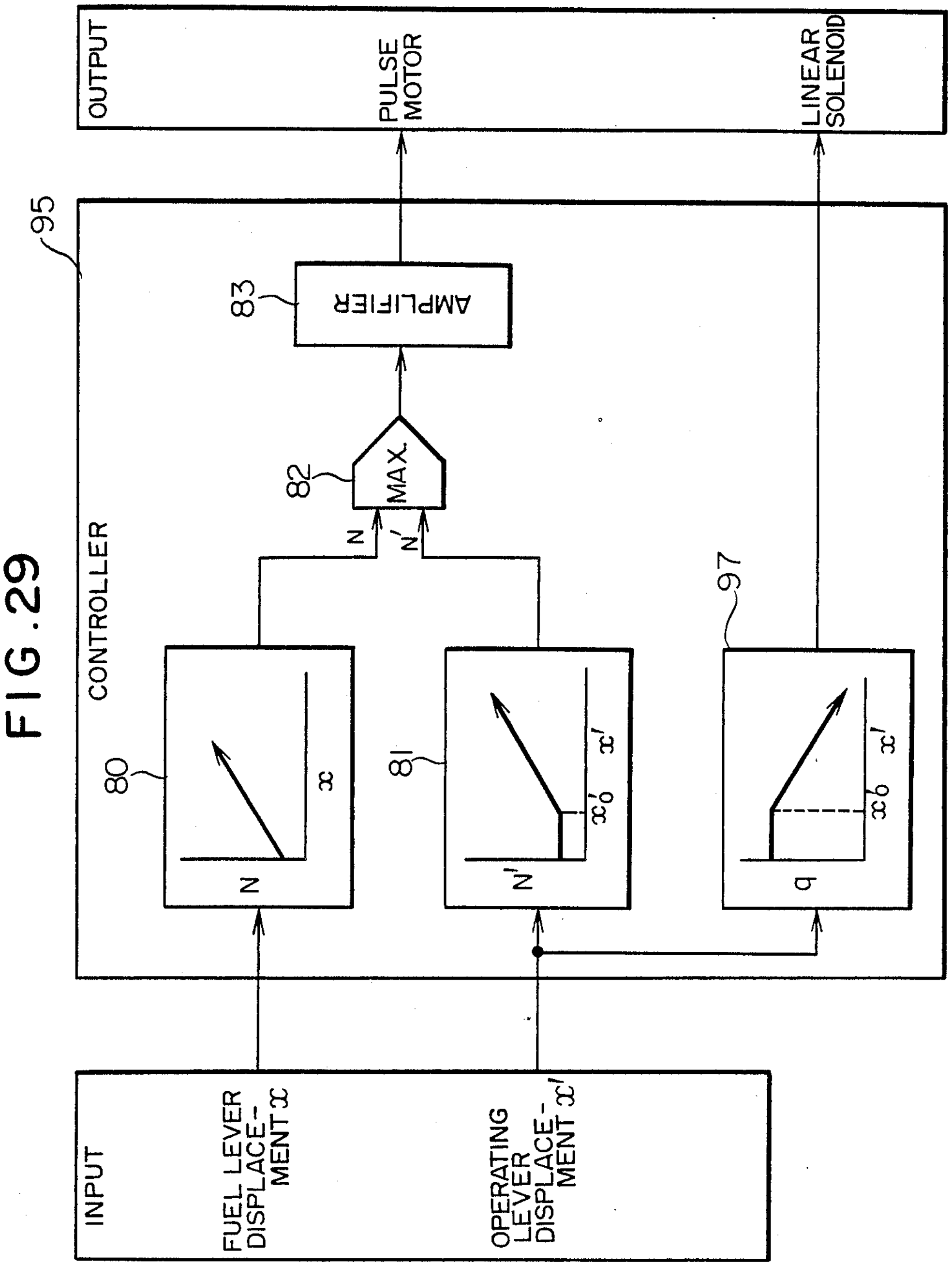
FIG. 29 is a schematic view of the contents of a controller in the drive control system illustrated in FIG. 28.

If it is desired to obtain the relationship between the operating lever displacement and the set rotational speed as shown in FIGS. 5 and 6, the controller 95 is arranged as shown in FIG. 29. That is, in addition to the arithmetic means 80 and 82 for generating command signals to the pulse motor 77, the maximum value selector 82 and the amplifier 83, the controller 95 comprises arithmetic means 97 into which displacement signals x' from the respective operating levers 9 and 72 are inputted. The arithmetic means 97 outputs, as a displacement volume control signal, such a displacement volume q as to maintain the displacement volume (angle of inclination) to the maximum value until the displacement signals reach the predetermined value $x'_0$, and to decrease the displacement volume in dependence upon an increase in the displacements as the displacement signals exceed the predetermined value $x'_0$. The output from the arithmetic means 97 is given to the linear solenoid cylinder 96.

If it is desired to obtain the relationship between the operating lever displacement and the set rotational speed as shown in FIGS. 10 and 11, the relationship as shown in FIG. 13 and the relationship as shown in FIG. 14, the arithmetic means 97 illustrated in FIG. 29 should be added to the arrangement of the controller illustrated in FIGS. 18–20.

Figure 30:
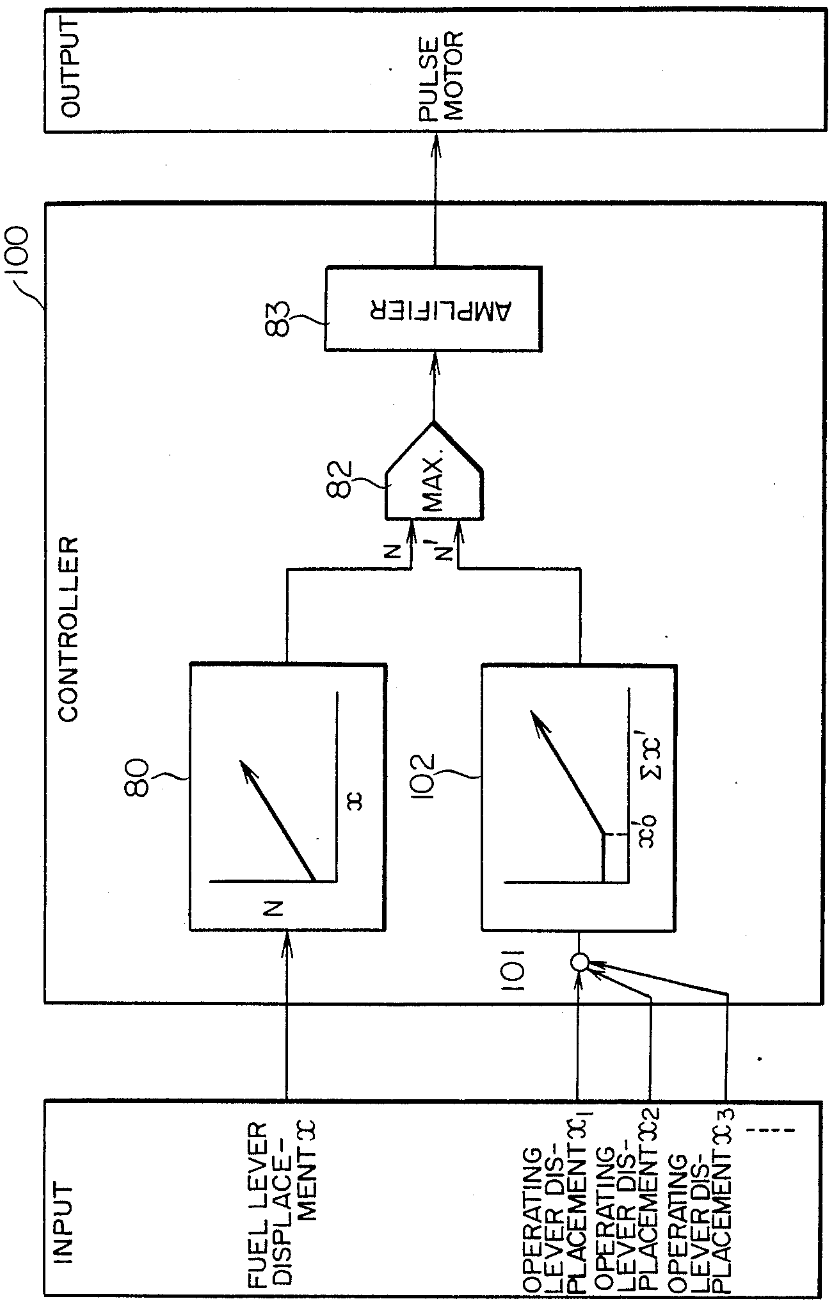
FIG. 30 is a schematic view of the contents of a controller in a drive control system according to a still further embodiment of the invention.

In the above embodiments, it has been described that the displacement of the operating lever 9 or 72 is employed independently as a judging value of the rotational speed control signal to increase the set rotational speed. However, an arrangement may be employed in which a total value of respective displacements of a plurality of operating levers is employed as the judging value. FIG. 30 shows an embodiment having such arrangement, with the entire system arrangement of the embodiment of FIG. 30 being intended for the system as shown in FIG. 16. The number of the hydraulic actuators 3 and 70 or the number of the operating devices 8 and 71 may optionally be increased to two or more.

In the embodiment of FIG. 30, in place of the arithmetic amplifier 81 shown in FIG. 17, a controller 100 comprises an adder 101 for adding respective displacements $x_1$, $x_2$, $x_3$, ... of the plurality of operating levers 9, 72, ... to each other, and arithmetic means 102 for outputting, as a rotational speed control signal, a rotational speed N′ increasing in dependence upon the displacements as the added total value x′ exceeds a predetermined value $x'_0$. With such arrangement, it is possible to effect setting of the engine rotational speed corresponding to the sum of the requisite flow rates with respect respectively to the plurality of hydraulic actuators 3, 70, ..... Thus, it is possible to control the engine rotational speed in conformity with the actual practice more than the case where a single operating lever displacement is employed independently.

Figure 28:
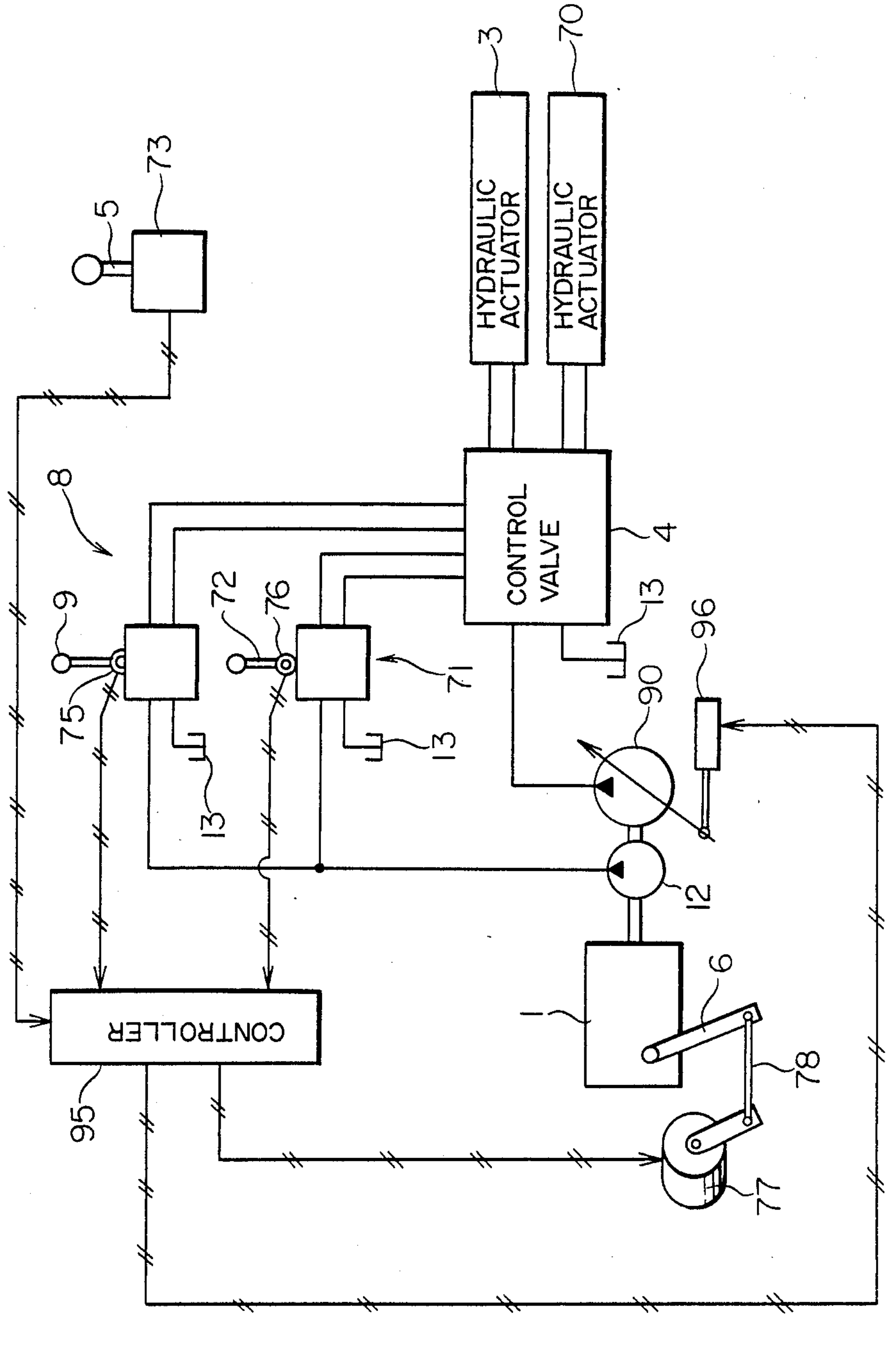
FIG. 28 is a diagrammatic view showing of a drive control system when the embodiment illustrated in FIG. 23 is arranged electronically.

The above concept can be applied to the embodiment illustrated in FIGS. 28 and 29. In this case, the arithmetic means 81 shown in FIG. 29 should be substituted for the adder 101 and the arithmetic means 102 illustrated in FIG. 30.

As will be apparent from the above, according to the drive control system of the invention, the maximum horsepower can optionally be set in compliance with the operational contents in the first region in which the rotational speed set by the first rotational speed setting means is validated. Accordingly, it is possible to improve the specific fuel consumption. In the second region in which rotational speed higher than the set rotational speed is set, it is possible to obtain the maximum horsepower suitable for the heavy load operation, so that the heavy load operation can be carried out under the optimum specific fuel consumption. Further, since, in the first region, the rotational speed does not fluctuate even if the second operating means is operated, fluctuation of the rotational speed of the prime mover due to the second operating means can be reduced as a whole, so that it is possible to diminish problems such as deterioration of the specific fuel consumption, smoke emission and noises due to the fluctuation. Moreover, since it is possible to optionally set the rotational speed of the level suitable for the operational contents in the first region, excellent operability can be secured.

What is claimed is:

1. A drive control system for a hydraulic construction machine, comprising a prime mover, a hydraulic pump driven by the prime mover, at least one hydraulic actuator driven by hydraulic fluid discharged from the hydraulic pump, first rotational speed setting means including first operating means for setting rotational speed of the prime mover, and second operating means for controlling operation of the hydraulic actuator, characterized by comprising:

second rotational speed setting means (20, 24; associated with the second operating means for outputting a rotational speed control signal increasing the set rotational speed of the prime mover when displacement of the second operating means exceeds a predetermined value; and rotational speed control means associated with at least the second rotational speed setting means, for validating the rotational speed set by the first rotational speed setting means (7; 80) in a first region in which displacement of the second operating means is at least equal to or less than said predetermined value, and for setting a rotational speed higher than the rotational speed set by the first rotational speed setting means, modified by the rotational speed control signal from the second rotational speed setting means in a second region in which the displacement of the second operating means is larger than the predetermined value.

2. A drive control system according to claim 1, characterized in that the second rotational speed setting means sets the rotational speed control signal so as to proportionally increase the set rotational speed in said second region in dependence upon displacement of the second operating means.

3. A drive control system according to claim 1, characterized in that the second rotational speed setting means sets said rotational speed control signal so as to bring the set rotational speed in said second region to a constant value.

4. A drive control system according to claim 1, characterized in that the rotational speed control means is so arranged so as to validate the rotational speed of the rotational speed control signal in said second region.

5. A drive control system according to claim 1, characterized in that the rotational speed control means is so arranged so as to add the rotational speed of the rotational speed control signal to the set rotational speed in said second region.

6. A drive control system according to claim 1, characterized in that the second rotational speed setting means comprises detecting means for detecting displacement of the second operating means, and control means for obtaining said rotational speed control signal on the basis of the displacement detected by the detecting means, and that the rotational speed control means comprises an actuator driven by an output signal from this control means.

7. A drive control system according to claim 1, characterized in that the first rotational speed setting means comprises means having inputted thereinto a displacement signal from the first operating means for obtaining the set rotational speed on the basis of the displacement, that the second rotational speed setting means comprises means having inputted thereinto a displacement signal from the second operating means for obtaining the rotational speed control signal on the basis of the displacement, and that the rotational speed control means comprises means for obtaining a final rotational speed on the basis of output signals from the respective first and second rotational speed setting means, and an actuator driven by an output signal from this means.

8. A drive control system according to claim 1, wherein said hydraulic pump is of variable capacity type, characterized by further comprising:

displacement volume control means for controlling said hydraulic pump so as to decrease a displacement volume of the hydraulic pump (90) when displacement of the second operating means (9) exceeds said predetermined value.

9. A drive control system according to claim 8, characterized in that said displacement volume control means is arranged to reduce the displacement volume so as to bring a discharge quantity of the hydraulic pump to a substantially constant value with respect to increasing rotational speed of the prime mover.

10. A drive control system according to one of claims 1 or claim 8 wherein a control valve is connected between said hydraulic pump and the hydraulic actuator for controlling flow rate and direction of discharge hydraulic fluid from the hydraulic pump, the control valve being controlled in position by said second operating means to control operation of the hydraulic actuator, characterized in that the control valve is so arranged that when displacement of the second operating means reaches said predetermined value, an opening degree of the control valve is brought to a maximum value.

11. A drive control system according to one of claims 1 or claim 8, including a plurality of hydraulic actuators and a plurality of second operating means, characterized in that said second rotational speed setting means is so arranged so as to increase the rotational speed of said rotational speed control signal as a sum of displacements of the plurality of respective second operating means exceeds said predetermined value.

12. A drive control system according to any one of claims 1 or 8, wherein a control valve is connected between said hydraulic pump and the hydraulic actuator or actuators, for controlling flow rate and direction of discharge hydraulic fluid from the hydraulic pump, the control valve being controlled in position by said second operating means to control operation of the hydraulic actuator or actuators, characterized in that the second rotational speed setting means calculates an opening degree of said control valve on the basis of a detecting signal indicative of displacement or displacements of the second operating means, and calculates the rotational speed control signal capable of obtaining discharge quantity of the hydraulic pump which corresponds to a requisite flow rate prescribed by the opening degree.

13. A drive control system according to claim 11, wherein a control valve is connected between said hydraulic pump and the hydraulic actuator or actuators, for controlling flow rate and direction of discharged hydraulic fluid from the hydraulic pump, the control valve being controlled in position by said second operating means to control operation of the hydraulic actuator or actuators, characterized in that the second rotational speed setting means calculates an opening degree of said control valve on the bases detecting signal indicative of displacement or displacements of the second operating means, and calculates the rotational speed control signal capable of obtaining discharge quantity of the hydraulic pump which corresponds to requisite flow rate prescribe by the opening degree.

* * * * *